United States Patent
Li et al.

(10) Patent No.: US 11,847,771 B2
(45) Date of Patent: Dec. 19, 2023

(54) SYSTEMS AND METHODS FOR QUANTITATIVE EVALUATION OF OPTICAL MAP QUALITY AND FOR DATA AUGMENTATION AUTOMATION

(71) Applicant: Samsung Electronics Co., Ltd., Suwon-si (KR)

(72) Inventors: Yingmao Li, Allen, TX (US); Chenchi Luo, Plano, TX (US); Youngjun Yoo, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 17/246,163

(22) Filed: Apr. 30, 2021

(65) Prior Publication Data
US 2021/0342998 A1 Nov. 4, 2021

Related U.S. Application Data

(60) Provisional application No. 63/018,754, filed on May 1, 2020.

(51) Int. Cl.
*G06T 7/00* (2017.01)
*G06T 7/215* (2017.01)
(Continued)

(52) U.S. Cl.
CPC .......... *G06T 7/0002* (2013.01); *G06T 3/0093* (2013.01); *G06T 7/215* (2017.01);
(Continued)

(58) Field of Classification Search
CPC .................... G06T 7/248; G06T 7/001; G06T 2207/20084; G06T 2207/30168;
(Continued)

(56) References Cited

U.S. PATENT DOCUMENTS 7,016,411 B2  3/2006  Azuma et al.
8,542,929 B2  9/2013  Kim et al.
(Continued)

FOREIGN PATENT DOCUMENTS

CN   108009643 A  *  5/2018  .......... G06N 99/005
CN   110880007 A  *  3/2020
(Continued)

OTHER PUBLICATIONS

Luo et al., "Wavelet Synthesis Net for Disparity Estimation to Synthesize DSLR Calibre Bokeh Effect on Smartphones", 2020 IEEE/CVF Conference on Computer Vision and Pattern Recognition (CVPR), Jun. 2020, 9 pages.
(Continued)

*Primary Examiner* — Ian L Lemieux
*Assistant Examiner* — Woo C Rhim

(57) ABSTRACT

A method includes obtaining at least one image and a ground truth map associated with the at least one image. The method also includes generating multiple optical maps using multiple algorithms and the at least one image. The method further includes, for each algorithm, identifying at least one score for the algorithm using one or more of the optical maps generated using the algorithm and the ground truth map. The ground truth map identifies one or more boundaries associated with one or more foreground objects in the at least one image. The scores identify how well the optical maps generated using the algorithms separate the one or more foreground objects from a background in the at least one image.

20 Claims, 15 Drawing Sheets

(51) Int. Cl.
*G06T 7/246* (2017.01)
*G06T 7/579* (2017.01)
*G06T 3/00* (2006.01)
*G06T 7/254* (2017.01)
*G06T 11/00* (2006.01)

(52) U.S. Cl.
CPC .............. *G06T 7/248* (2017.01); *G06T 7/254* (2017.01); *G06T 7/579* (2017.01); *G06T 11/00* (2013.01); *G06T 2207/20081* (2013.01); *G06T 2207/30168* (2013.01)

(58) Field of Classification Search
CPC . G06T 7/0002; G06T 7/11; G06T 7/10; G06T 7/194; G06T 7/12; G06T 7/13; G06T 7/215; G06T 2210/12; G06T 7/136; G06V 10/28
See application file for complete search history.

(56) References Cited

U.S. PATENT DOCUMENTS

| | | | |
|---|---|---|---|
| 8,817,069 B2 | 8/2014 | Alessandrini et al. | |
| 10,212,408 B1* | 2/2019 | Pappas-Katsiafas | ........................ H04N 13/156 |
| 10,255,686 B2 | 4/2019 | Bhardwaj et al. | |
| 10,452,960 B1* | 10/2019 | Li | ............................ G06N 3/08 |
| 2003/0142866 A1* | 7/2003 | Zuniga | ...................... G06T 7/11 382/171 |
| 2016/0004919 A1 | 1/2016 | Aliseychik et al. | |
| 2016/0026912 A1 | 1/2016 | Falcon et al. | |
| 2017/0084040 A1* | 3/2017 | Rad | ........................ G06V 10/28 |
| 2017/0358094 A1* | 12/2017 | Sun | ........................ G06T 7/11 |
| 2018/0108137 A1* | 4/2018 | Price | ........................ G06N 3/08 |
| 2019/0057507 A1* | 2/2019 | El-Khamy | ............. G06V 10/82 |
| 2019/0102693 A1 | 4/2019 | Yates et al. | |
| 2019/0164313 A1* | 5/2019 | Ma | ................... G06V 30/18105 |
| 2019/0188574 A1 | 6/2019 | Menon et al. | |
| 2019/0205606 A1 | 7/2019 | Zhou et al. | |
| 2019/0295231 A1* | 9/2019 | Zhao | ..................... G06V 10/141 |
| 2019/0392242 A1* | 12/2019 | Tariq | ................... G06F 18/2413 |
| 2020/0005465 A1 | 1/2020 | Wantuch et al. | |
| 2020/0082541 A1* | 3/2020 | Jouppi | ..................... G06T 5/002 |
| 2020/0117953 A1 | 4/2020 | Cooper et al. | |
| 2020/0134331 A1 | 4/2020 | Poddar et al. | |
| 2020/0160533 A1 | 5/2020 | Du et al. | |
| 2020/0175700 A1* | 6/2020 | Zhang | .................... G06T 3/4007 |
| 2020/0202174 A1 | 6/2020 | Lin | |
| 2020/0226474 A1* | 7/2020 | Fidler | ..................... G06N 3/084 |
| 2021/0056708 A1* | 2/2021 | Li | ........................ G06V 10/255 |
| 2021/0133474 A1* | 5/2021 | Sawada | ................ G06V 10/811 |
| 2021/0150227 A1* | 5/2021 | Hu | ............................ G06T 7/174 |
| 2021/0150728 A1* | 5/2021 | Ahmed | ................ G06V 10/273 |
| 2021/0248423 A1* | 8/2021 | Munoz Delgado | ....... G06N 3/08 |
| 2021/0326656 A1* | 10/2021 | Lee | ......................... G06N 3/045 |
| 2023/0153654 A1* | 5/2023 | Parker | ...................... G06N 5/04 706/12 |

FOREIGN PATENT DOCUMENTS

| | | |
|---|---|---|
| JP | 2012247987 A | 12/2012 |
| KR | 10-0557618 B1 | 3/2006 |
| KR | 10-0873638 B1 | 12/2008 |
| KR | 10-1660808 B1 | 9/2016 |
| KR | 10-2020-0063311 A | 6/2020 |
| WO | 2019/220622 A1 | 11/2019 |

OTHER PUBLICATIONS

Wang et al., "FADNet: A Fast and Accurate Network for Disparity Estimation", 2020 IEEE International Conference on Robotics and Automation (ICRA), Mar. 2020, 7 pages.

Soo-kyung et al., "Fast AutoAugment, Introducing an algorithm for automatic detection of image aggregation", https://www.kakaobrain.com/blog/116, Feb. 2020, 21 pages.

Lim et al., "Fast AutoAugment", https://arxiv.org/abs/1905.00397v2, May 2019, 8 pages.

Rezatofight et al., "Generalized Intersection over Union: A Metric and A Loss for Bounding Box Regression", 2019 IEEE/CVF Conference on Computer Vision and Pattern Recognition (CVPR), 2019, 9 pages.

Hataya et al., "Faster AutoAugment: Learning Augmentation Strategies Using Backpropagation", https://arxiv.org/abs/1911.06987v1, 2019, 16 pages.

Chen et al., "DeepLab: Semantic Image Segmentation with Deep Convolutional Nets, Atrous Convolution, and Fully Connected CRFs", 2018 IEEE Transactions on Pattern Analysis and Machine Intelligence, vol. 40, Issue 4, Apr. 2018, 14 pages.

Hauser et al., "Image quality benchmark of computational bokeh", Society for Imaging Science and Technology, 2018, 10 pages.

Lin et al., "Depth Recovery from Light Field Using Focal Stack Symmetry", 2015 IEEE International Conference on Computer Vision (ICCV), 2015, 9 pages.

Wadhwa et al., "Synthetic Depth-of-Field with a Single-Camera Mobile Phone", ACM Trans. Graph., vol. 37, No. 4, Jun. 2018, 18 pages.

Liu et al., "Bokeh Effects Based on Stereo Vision", International Conference on Computer Analysis of Images and Patterns, Sep. 2015, 13 pages.

Eigen et al., "Depth Map Prediction from a Single Image using a Multi-Scale Deep Network", Proceedings of the 27th International Conference on Neural Information Processing Systems, 2014, 9 pages.

Garg et al., "Unsupervised CNN for Single View Depth Estimation: Geometry to the Rescue", European Conference on Computer Vision, Sep. 2016, 21 pages.

Liu et al., "Single Image Depth Estimation From Predicted Semantic Labels", 2010 IEEE Computer Society Conference on Computer Vision and Pattern Recognition, Jun. 2010, 8 pages.

Zbontar et al., "Stereo Matching by Training a Convolutional Neural Network to Compare Image Patches", Journal of Machine Learning Research 17, 2016, 32 pages.

Chang et al., "Pyramid Stereo Matching Network", 2018 IEEE/CVF Conference on Computer Vision and Pattern Recognition, Mar. 2018, 9 pages.

Poggi et al., "Guided Stereo Matching", https://arxiv.org/abs/1905.10107, 2019, 10 pages.

Liang et al., "Learning for Disparity Estimation through Feature Constancy", 2018 IEEE/CVF Conference on Computer Vision and Pattern Recognition, 2018, 10 pages.

Dosovitskiy et al., "FlowNet: Learning Optical Flow with Convolutional Networks", 2015 IEEE International Conference on Computer Vision (ICCV), Dec. 2015, 9 pages.

Ilg et al., "FlowNet 2.0: Evolution of Optical Flow Estimation with Deep Networks", 2017 IEEE Conference on Computer Vision and Pattern Recognition (CVPR), Jul. 2017, 9 pages.

Zhao et al., "Pyramid Scene Parsing Network", 2017 IEEE Conference on Computer Vision and Pattern Recognition (CVPR), Apr. 2017, 10 pages.

Hui et al., "LiteFlowNet: A Lightweight Convolutional Neural Network for Optical Flow Estimation", 2018 IEEE/CVF Conference on Computer Vision and Pattern Recognition, May 2018, 9 pages.

Geiger et al., "Vision meets Robotics: The KITTI Dataset", International Journal of Robotics Research, 2013, 6 pages.

Butler et al., "MPI-Sintel Optical Flow Benchmark: Supplemental Material", Max Planck Institute for Intelligent Systems, Nov. 2012, 16 pages.

Howard et al., "MobileNets: Efficient Convolutional Neural Networks for Mobile Vision Applications", https://arxiv.org/abs/1704.04861v1, Apr. 2017, 9 pages.

Sandler et al., "MobileNetV2: Inverted Residuals and Linear Bottlenecks", 2018 IEEE/CVF Conference on Computer Vision and Pattern Recognition, Jun. 2018, 14 pages.

(56) References Cited

OTHER PUBLICATIONS

Ronneberger et al., "U-Net: Convolutional Networks for Biomedical Image Segmentation", International Conference on Medical Image Computing and Computer-Assisted Intervention, May 2015, 8 pages.
Cicek et al., "3D U-Net: Learning Dense Volumetric Segmentation from Sparse Annotation", International Conference on Medical Image Computing and Computer-Assisted Intervention, Oct. 2016, 8 pages.
Zhang et al., "Road Extraction by Deep Residual U-Net", IEEE Geoscience and Remote Sensing Letters, Nov. 2017, 5 pages.
Jansson et al., "Singing Voice Separation with Deep U-Net Convolutional Networks", Proceedings of the 18th ISMIR Conference, Oct. 2017, 7 pages.
Qiu et al., "UnrealCV: Connecting Computer Vision to Unreal Engine", European Conference on Computer Vision, Sep. 2016, 8 pages.
Srivastava et al., "Dropout: A Simple Way to Prevent Neural Networks from Overfitting", Journal of Machine Learning Research Jun. 15, 2014, 30 pages.
International Search Report and Written Opinion of the International Searching Authority dated Aug. 5, 2021 in connection with International Patent Application No. PCT/KR2021/005566, 9 pages.

\* cited by examiner

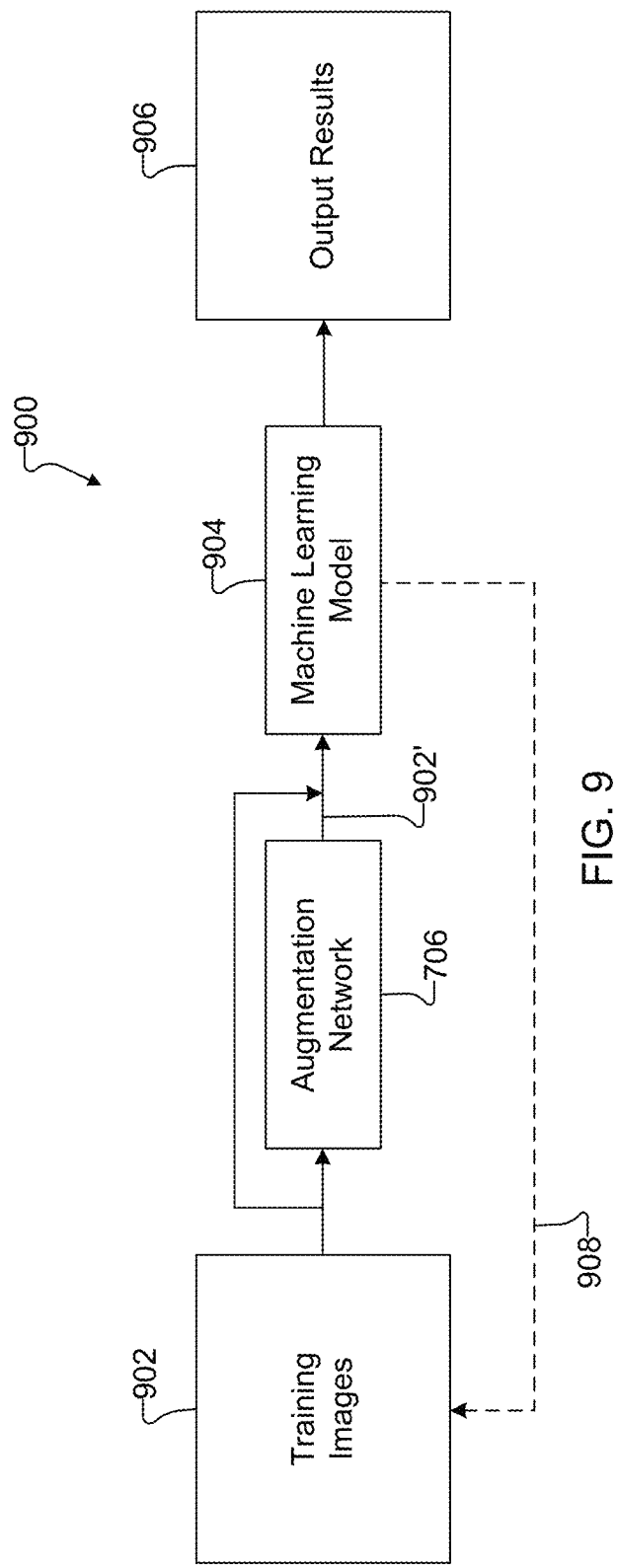

SYSTEMS AND METHODS FOR QUANTITATIVE EVALUATION OF OPTICAL MAP QUALITY AND FOR DATA AUGMENTATION AUTOMATION

CROSS-REFERENCE TO RELATED APPLICATION AND PRIORITY CLAIM

This application claims priority under 35 U.S.C. § 119(e) to U.S. Provisional Patent Application No. 63/018,754 filed on May 1, 2020, which is hereby incorporated by reference in its entirety.

TECHNICAL FIELD

This disclosure relates generally to imaging systems. More specifically, this disclosure relates to systems and methods for quantitative evaluation of optical map quality and for data augmentation automation.

BACKGROUND

Many mobile electronic devices, such as smartphones and tablet computers, include cameras that can be used to capture still and video images. While convenient, cameras on mobile electronic devices typically suffer from a number of shortcomings. For example, various image processing operations performed on mobile electronic devices rely on depth maps, disparity maps, optical flow maps, or other maps associated with scenes being imaged. A depth map generally identifies the depth of each pixel captured in an image of a scene. A disparity map generally identifies the disparity in positions of common points in multiple images of a scene captured by different cameras (where disparities are based on depths of the common points). An optical flow map generally identifies differences in multiple images of a scene due to object motion within the scene. The quality of a depth map, disparity map, optical flow map, or other map associated with a scene can directly impact the quality of the image processing operation's results. However, determining the quality of a map is often highly subjective.

As another example, various image processing operations performed on mobile electronic devices rely on trained machine learning models. Machine learning models are typically trained using specified sets of training data, and data augmentation can be useful in training robust machine learning models. Data augmentation refers to the process of taking a set of training data and generating additional training data based on the set, which allows a machine learning model to be trained using both the original set of training data and the additional training data. Unfortunately, existing augmentation approaches often simply apply brute-force random data augmentation to a set of training data, and the accuracy of a machine learning model that is trained using data augmented in this manner can be reduced. Among other reasons, this is because variances in real-world data processed by the machine learning model when placed into actual use may not be easily modeled using a random approach.

SUMMARY

This disclosure relates to systems and methods for quantitative evaluation of optical map quality and for data augmentation automation.

In a first embodiment, a method includes obtaining at least one image and a ground truth map associated with the at least one image. The method also includes generating multiple optical maps using multiple algorithms and the at least one image. The method further includes, for each algorithm, identifying at least one score for the algorithm using one or more of the optical maps generated using the algorithm and the ground truth map. The ground truth map identifies one or more boundaries associated with one or more foreground objects in the at least one image. The scores identify how well the optical maps generated using the algorithms separate the one or more foreground objects from a background in the at least one image.

In a second embodiment, an apparatus includes at least one processor configured to obtain at least one image and a ground truth map associated with the at least one image. The at least one processor is also configured to generate multiple optical maps using multiple algorithms and the at least one image. The at least one processor is further configured, for each algorithm, to identify at least one score for the algorithm using one or more of the optical maps generated using the algorithm and the ground truth map. The ground truth map identifies one or more boundaries associated with one or more foreground objects in the at least one image. The scores identify how well the optical maps generated using the algorithms separate the one or more foreground objects from a background in the at least one image.

In a third embodiment, a non-transitory computer readable medium contains instructions that when executed cause at least one processor to obtain at least one image and a ground truth map associated with the at least one image. The medium also contains instructions that when executed cause the at least one processor to generate multiple optical maps using multiple algorithms and the at least one image. The medium further contains instructions that when executed cause the at least one processor, for each algorithm, to identify at least one score for the algorithm using one or more of the optical maps generated using the algorithm and the ground truth map. The ground truth map identifies one or more boundaries associated with one or more foreground objects in the at least one image. The scores identify how well the optical maps generated using the algorithms separate the one or more foreground objects from a background in the at least one image.

In a fourth embodiment, a method includes training, using at least one processor, an augmentation network based on multiple first images, where the augmentation network is trained to generate additional images having one or more photometric characteristics that match or are similar to one or more photometric characteristics of at least some of the first images. The method also includes providing, using the at least one processor, multiple second images to the augmentation network. The method further includes generating, using the at least one processor, multiple third images by the augmentation network based on at least some of the second images. In addition, the method includes training, using the at least one processor, a machine learning model to perform an image processing operation using at least some of the second and third images.

In a fifth embodiment, an apparatus includes at least one processor configured to train an augmentation network based on multiple first images, where the augmentation network is trained to generate additional images having one or more photometric characteristics that match or are similar to one or more photometric characteristics of at least some of the first images. The at least one processor is also configured to provide multiple second images to the augmentation network and generate multiple third images using the augmentation network based on at least some of the second images. The at least one processor is further configured to train a machine learning model to perform an image processing operation using at least some of the second and third images.

In a sixth embodiment, a non-transitory computer readable medium contains instructions that when executed cause at least one processor to train an augmentation network based on multiple first images, where the augmentation network is trained to generate additional images having one or more photometric characteristics that match or are similar to one or more photometric characteristics of at least some of the first images. The medium also contains instructions that when executed cause the at least one processor to provide multiple second images to the augmentation network and generate multiple third images using the augmentation network based on at least some of the second images. The medium further contains instructions that when executed cause the at least one processor to train a machine learning model to perform an image processing operation using at least some of the second and third images.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 9 illustrates an example technique for training a machine learning model using data augmentation automation in accordance with this disclosure;

DETAILED DESCRIPTION

Figure 1:
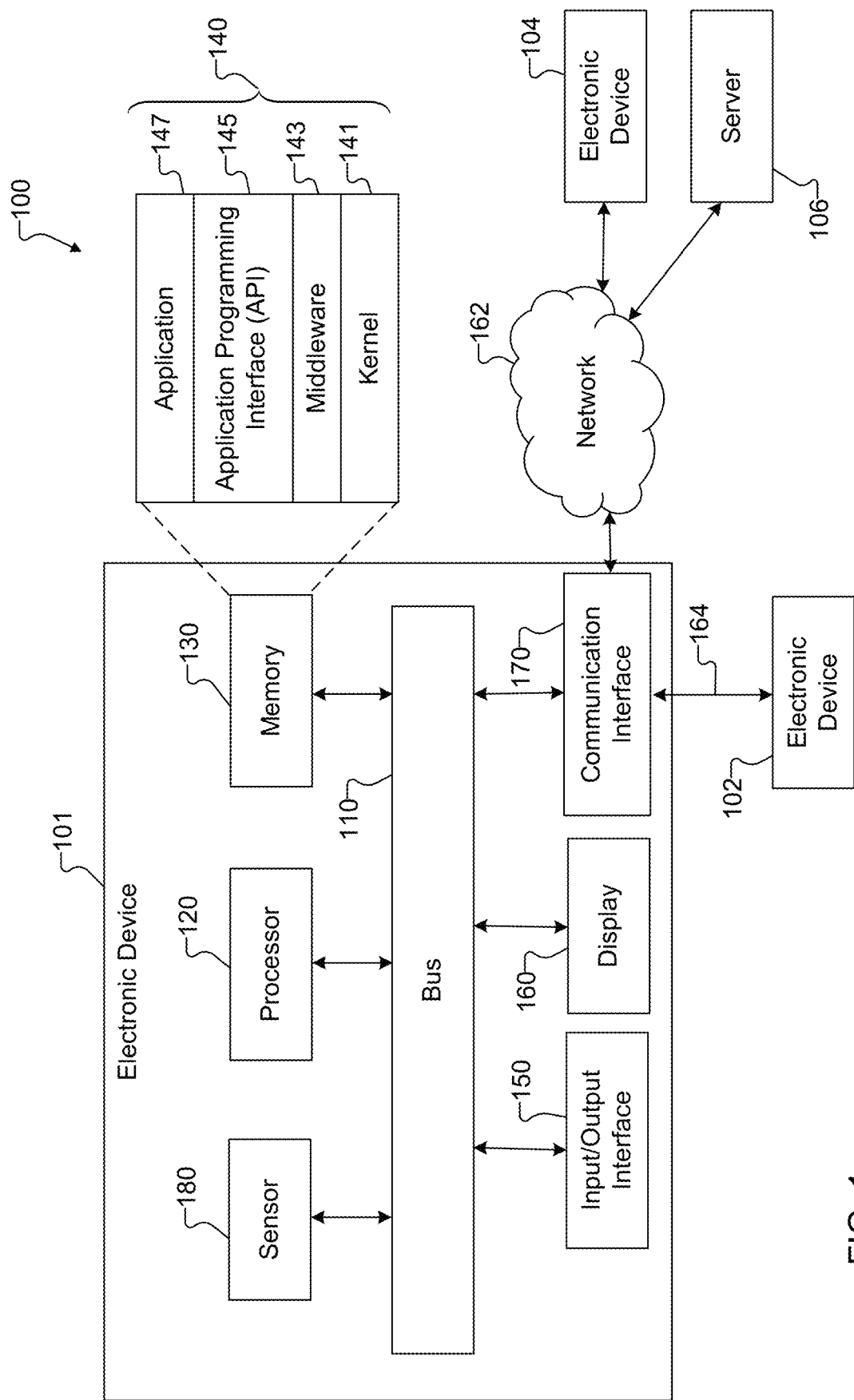
FIG. 1 illustrates an example network configuration including an electronic device in accordance with this disclosure.

FIGS. 1 through 15, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, many mobile electronic devices, such as smartphones and tablet computers, include cameras that can be used to capture still and video images. While convenient, cameras on mobile electronic devices typically suffer from a number of shortcomings. For example, various image processing operations performed on mobile electronic devices rely on depth maps, disparity maps, optical flow maps, or other maps (referred to collectively as "optical maps") associated with scenes being imaged. A depth map generally identifies the depth of each pixel captured in an image of a scene. A disparity map generally identifies the disparity in positions of common points in multiple images of a scene captured by different cameras (where disparities are based on depths of the common points). An optical flow map generally identifies differences in multiple images of a scene due to object motion within the scene. The quality of a depth map, disparity map, optical flow map, or other map associated with a scene can directly impact the quality of the image processing operation's results. However, determining the quality of a map is often highly subjective, which makes performing certain functions more difficult.

As a particular example of this difficulty, various algorithms have been developed for identifying optical maps associated with scenes. Ideally, quantitative evaluations may be used to identify which of the algorithms provides better results in different circumstances or to help identify improvements in the accuracies of these types of algorithms. Unfortunately, it is often a challenging task to estimate the qualities of optical maps for given images because there is a lack of pixel-accurate ground truths associated with those images. A "ground truth" here represents the actual or correct depths, disparities, optical flows, or other contents that should be included in an optical map for an image if an algorithm perfectly generated the optical map. In many cases, pixel-accurate ground truths are only available through the use of synthetic image data. However, effective training of a neural network or other machine-learning algorithm that generates optical maps may require the use of real-world images as training data, not merely synthetic image data.

This disclosure provides techniques for quantitative evaluation of optical map quality. As described in more detail below, an input image and its associated ground truth map are obtained, where the input image includes one or more foreground objects in a scene and the ground truth map accurately distinguishes between the foreground object(s) and the background within the scene. The input image can be processed by multiple algorithms to generate optical maps, and a maximum intersection over union (IoU) score can be identified for each algorithm based on how well each algorithm's optical map overlaps with the ground truth map. Effectively, this process converts the evaluation of optical map qualities into a segmentation evaluation task, meaning the process determines how well the different algorithms can generate optical maps that separate the foreground object(s) from the background in the scene. The scores provide an objective or quantitative evaluation of the different optical maps, which allows an assessment of the various algorithms' results. This process can be repeated any number of times, such as to identify average IoU scores or to identify IoU scores for different scenes. In this way, the disclosed techniques can be used to allow algorithms to be evaluated and improved more quantitatively and effectively.

As another example, various image processing operations performed on mobile electronic devices rely on trained machine learning models. Machine learning models are typically trained using specified sets of training data, and data augmentation can be useful in training robust machine learning models. Data augmentation refers to the process of taking a set of training data and generating additional training data based on the set, which allows a machine learning model to be trained using both the original set of training data and the additional training data. Unfortunately, existing augmentation approaches often simply apply brute-force random data augmentation to a set of training data, and the accuracy of a machine learning model that is trained using data augmented in this manner can be reduced. Among other reasons, this is because variances in real-world data processed by the machine learning model when placed into actual use may not be easily modeled using a random approach.

As a particular example of this difficulty, a machine learning model may be trained to process images of scenes captured at or near the same time by one or more cameras, where different capture settings (such as different exposure settings) and/or cameras with different hardware specifications are used to capture the images. Because of the different capture settings and/or hardware specifications, the captured images can appear significantly different. The machine learning model may be trained to process these types of images and generate depth maps, disparity maps, or other maps associated with the scenes. Randomly applying photometric augmentation in order to randomly change the contrast, hue, exposure, etc. of training images used to train the machine learning model may be performed to augment the training images. However, this can still result in a number of artifacts being produced in depth, disparity, or other maps after the trained machine learning model is placed into use. This is because the differences between real-world images captured by the different cameras are difficult to formulate using simple random augmentation.

This disclosure also provides techniques for data augmentation automation. As described in more detail below, an augmentation network can be trained to model differences contained in actual real-world data, such as real-world images. The augmentation network can then be used during the training process for a machine learning model to generate augmented training data, and the machine learning model can be trained using original training data and the augmented training data. Because the augmentation network is trained to model the types of differences that may actually appear in the real-world data, the augmentation network can be used to produce augmented training data that is more tailored to real-world usage of the machine learning model (as opposed to simply randomly changing the training data in order to augment the training data). Because of this, the trained machine learning model is able to process real-world images and generate more accurate processing results, such as depth maps, disparity maps, or other image processing results that contain less artifacts.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, for example, the processor 120 may obtain and process input images and ground truth maps in order to perform a quantitative evaluation of optical map quality as described in more detail below. Also, in some embodiments of this disclosure, the processor 120 may use an augmentation network to facilitate training of a machine learning model as described in more detail below, and the processor 120 may then use the trained machine learning model to perform one or more functions.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain and process input images and ground truth maps to perform a quantitative evaluation of optical map quality. The application 147 may also or alternatively include one or more applications that, among other things, use an augmentation network to facilitate training of a machine learning model. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106).

For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments of this disclosure, the server 106 may obtain and process input images and ground truth maps in order to perform a quantitative evaluation of optical map quality as described in more detail below. Also, in some embodiments of this disclosure, the server 106 may use an augmentation network to facilitate training of a machine learning model as described in more detail below, and the server 106 may be used to train the machine learning model, which can then be provided to various other devices (such as the electronic device 101) for actual use.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
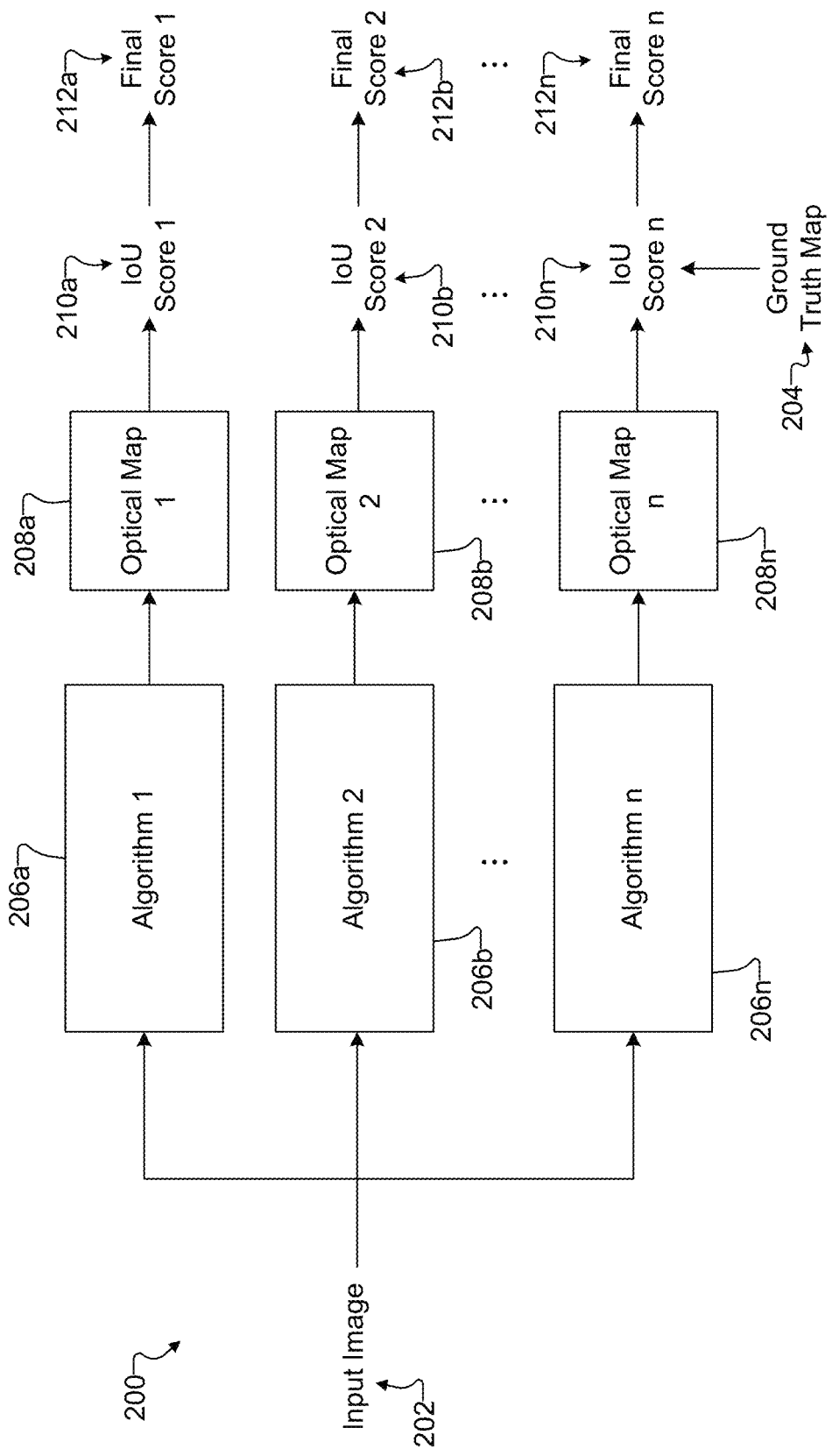
FIG. 2 illustrates an example technique for quantitative evaluation of optical map quality in accordance with this disclosure.

FIG. 2 illustrates an example technique 200 for quantitative evaluation of optical map quality in accordance with this disclosure. For ease of explanation, the technique 200 is described as being performed in the network configuration 100 of FIG. 1, such as by the electronic device 101 or the server 106. However, the technique 200 may be performed by any other suitable devices and in any other suitable systems.

As shown in FIG. 2, the technique 200 operates by receiving at least one input image 202 and at least one ground truth map 204. Each input image 202 generally represents an image of a scene in which one or more foreground objects are present and distinguishable from a background of the scene. Each ground truth map 204 generally represents an optical map that identifies the one or more foreground objects in the scene as distinguished from the background of the scene. For example, a ground truth map 204 may include pixels having a one-to-one correspondence with pixels of an input image 202, where each pixel of the ground truth map 204 has one value or color (such as white) when the corresponding pixel in the input image 202 is part of a foreground object and another value or color (such as black) when the corresponding pixel in the input image 202 is part of the background (or vice versa).

The input image(s) 202 and the ground truth map(s) 204 may be generated or otherwise obtained from any suitable source or sources. For example, the input image(s) 202 may be captured by a user using an electronic device (such as the electronic device 101) or any other suitable image capture device. The ground truth map(s) 204 may be generated manually (such as when a user manually identifies one or more borders of one or more foreground objects in the input image(s) 202) or automatically (such as by using an image segmentation algorithm that identifies one or more borders of one or more foreground objects in the input image(s) 202).

The one or more input images 202 are provided to multiple algorithms 206a-206n, each of which generally operates to respectively produce an optical map 208a-208n associated with the input image(s) 202. The optical maps 208a-208n may represent depth maps, disparity maps, optical flow maps, or other types of optical maps generated using one or more input images 202. The algorithms 206a-206n represent different algorithms that can be used to generate the optical maps 208a-208n based on the input image(s) 202. Depending on the implementation, different algorithms 206a-206n may use completely different techniques to generate the optical maps 208a-208n, and/or different algorithms 206a-206n may use the same or similar techniques with different settings to generate the optical maps 208a-208n. As particular examples, different algorithms 206a-206n may represent different machine learning algorithms, or different algorithms 206a-206n may represent the same overall type of machine learning algorithm that has been trained differently (such as by using different training data or different learning approaches). In general, there are a number of algorithms known in the art for generating optical maps like depth maps, disparity maps, and optical flow maps, and additional algorithms are sure to be developed in the future.

Note that the type of optical maps 208a-208n being generated can affect how many input images 202 are received and processed by the algorithms 206a-206n. For example, at least some of the algorithms 206a-206n may be used to generate depth or disparity maps based on a single input image 202, and/or at least some of the algorithms 206a-206n may be used to generate depth or disparity maps based on two or more input images 202. As another example, the algorithms 206a-206n may be used to generate optical flow maps based on two or more input images 202.

The optical maps 208a-208n are scored using the ground truth map(s) 204 and an intersection over union (IoU) approach to generate IoU scores 210a-210n. The IoU scores 210a-210n represent quantitative measurements of how well the optical maps 208a-208n match the ground truth map(s) 204. As described in more detail below, each of the IoU scores 210a-210n can be based on a ratio of (i) the intersection of an optical map 208a-208n with an associated ground truth map 204 and (ii) the union of the optical map 208a-208n with the associated ground truth map 204. In some embodiments, the intersection may be determined based on the number of pixels identified as being associated with at least one foreground object in both the optical map 208a-208n and the associated ground truth map 204. Also, in some embodiments, the union may be determined based on the number of pixels identified as being associated with at least one foreground object in either or both of the optical map 208a-208n and the associated ground truth map 204.

Since the IoU scores 210a-210n represent quantitative measurements of how well the optical maps 208a-208n match the ground truth map(s) 204, the IoU scores 210a-210n can be used to quantitatively evaluate how well the algorithms 206a-206n are operating to generate the optical maps 208a-208n. This allows for a more objective assessment of the various algorithms 206a-206n and the optical maps that are generated by those algorithms 206a-206n.

Note that while each algorithm 206a-206n here is shown as generating one optical map 208a-208n, each of the algorithms 206a-206n may be used to generate multiple optical maps 208a-208n using the same input image(s) 202. For example, each of the algorithms 206a-206n may generate multiple thresholded optical maps, where each thresholded optical map represents an optical map generated by applying a threshold to the values produced by the algorithms 206a-206n. One example of this is described below, where the threshold controls whether the pixels in the optical maps 208a-208n are associated with a foreground object or background. As a particular example, a threshold may represent a value within the range of 0 to 255, where values below the threshold are said to be associated with a foreground object and values above the threshold are said to be associated with background (or vice versa). Here, different thresholds may be used to produce different optical maps 208a based on values generated by the algorithm 206a, different optical maps 208b based on values generated by the algorithm 206b, and so on. In some cases, the threshold value may be swept from 0 to 255 (or across some other full or partial range of values) so that each algorithm 206a-206n can generate multiple optical maps 208a-208n. Here, each optical map 208a-208n generated by each algorithm 206a-206n can be scored, and the resulting scores can be processed (such as by selecting the maximum score) to identify the IoU scores 210a-210n for the algorithms 206a-206n.

As another example, the process shown in FIG. 2 may be repeated for multiple input images 202 or multiple sets of input images 202 (and their associated ground truth maps 204). In some cases, for instance, the input images 202 or sets of input images 202 can include different foreground objects, common foreground objects in different positions, different backgrounds, or any combination thereof. Again, each algorithm 206a-206n may be used here to generate one or more optical maps 208a-208n for each input image 202 or each set of input images 202, and an IoU score 210a-210n can be generated for each algorithm 206a-206n using the appropriate ground truth map(s) 204. The IoU scores 210a-210n generated for multiple input images 202 or multiple sets of input images 202 can be averaged or otherwise processed to generate final scores 212a-212n for the algorithms 206a-206n.

The scores 210a-210n and/or 212a-212n may be stored, output, or used in any suitable manner. For example, in some embodiments, a table of scores may be generated and presented to a user. As a particular example, the table may identify the IoU score 210a-210n achieved by each algorithm 206a-206n for each input image 202 or each set of input images 202. The table may also identify the overall final score 212a-212n achieved by each algorithm 206a-206n.

In this way, the technique 200 can be used to effectively generate quantitative scores that allow for assessments of the various algorithms 206a-206n to occur. Among other things, this may allow users or automated systems to identify which of the various algorithms 206a-206n provides desired accuracy, to identify which of the various algorithms 206a-206n provides better results, or to otherwise compare the results obtained by the various algorithms 206a-206n. As a particular example, this may allow users to quantitatively evaluate whether changed settings to a particular algorithm provide improved results compared to the original algorithm. Moreover, this can be accomplished without relying on human observations or comparisons, which inevitably incorporate normal human biases and preferences.

Note that the operations and functions described above with reference to FIG. 2 can be implemented in an electronic device 101, 102, 104, server 106, or other device in any suitable manner. For example, in some embodiments, the operations and functions described above with reference to FIG. 2 can be implemented or supported using one or more software applications or other software instructions that are executed by at least one processor 120 of a device. In other embodiments, at least some of the operations and functions described above with reference to FIG. 2 can be implemented or supported using dedicated hardware components. In general, the operations and functions described above with reference to FIG. 2 can be performed using any suitable hardware or any suitable combination of hardware and software/firmware instructions.

Although FIG. 2 illustrates one example of a technique 200 for quantitative evaluation of optical map quality, various changes may be made to FIG. 2. For example, any suitable number of algorithms 206a-206n may be used here, and each algorithm 206a-206n may be used to process any suitable number of input images 202 and generate any suitable number of IoU scores 210a-210n. In addition, any suitable type of processing may be used to combine or otherwise use multiple IoU scores 210a-210n when generating the final scores 212a-212n for the algorithms 206a-206n.

Figure 3:
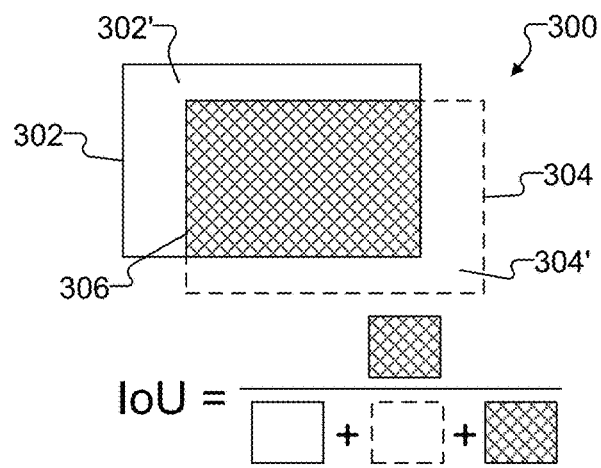
FIG. 3 illustrates an example scoring approach for optical maps during quantitative evaluation in accordance with this disclosure.

FIG. 3 illustrates an example scoring approach 300 for optical maps during quantitative evaluation in accordance with this disclosure. In particular, the scoring approach 300 shown here can be used to generate IoU scores, such as the IoU scores 210a-210n in FIG. 2. For ease of explanation, the scoring approach 300 is described as being performed as part of the technique of FIG. 2 in the network configuration 100 of FIG. 1, such as by the electronic device 101 or the server 106. However, the scoring approach 300 may be performed by any other suitable devices and in any other suitable systems.

As shown in FIG. 3, an optical map 302 is shown as overlapping (to some extent) with a ground truth map 304, which defines an overlapping region 306. A region 302' of the optical map 302 may not overlap with the ground truth map 304, and a region 304' of the ground truth map 304 may not overlap with the optical map 302. Note that the amount of overlap here varies based on the accuracy of the optical map 302 with the ground truth map 304, so the actual amount of overlap will vary depending on the circumstances.

The overlap and non-overlap here are meant to be illustrative but not literal. That is, the optical map 302 and the ground truth map 304 may generally be the same size and may both be aligned with an image (such as an input image 202). The optical map 302 and the ground truth map 304 generally include pixels that consistently identify foreground objects versus background, and those pixels are collectively represented by the overlapping region 306. Thus, the size of the overlapping region 306 depends on the number of pixels in both the optical map 302 and the ground truth map 304 that consistently identify foreground objects versus background. The optical map 302 and the ground truth map 304 may also include pixels that inconsistently identify foreground objects versus background, and those pixels are represented by the non-overlapping regions 302' and 304'. As a result, the overlapping region 306 here is meant to illustratively represent the number of pixels in the optical map 302 and the ground truth map 304 that consistently identify foreground objects versus background. Because of this, larger overlap indicates more consistently between the optical map 302 and the ground truth map 304, while smaller overlap indicates less consistently between the optical map 302 and the ground truth map 304.

In this example, an IoU score is calculated as the ratio of (i) the size of the overlapping region 306 and (ii) the collective size of the overlapping and non-overlapping regions 302', 304', 306. In other words, the numerator of the ratio represents the intersection (I) of the optical map 302 and the ground truth map 304, while the denominator of the ratio represents the union (U) of the optical map 302 and the ground truth map 304. This gives rise to the notation of "intersection over union" or "IoU." In some embodiments, the intersection may be determined based on the number of pixels identified as being associated with at least one foreground object in both the optical map 302 and the ground truth map 304, and the union may be determined based on the number of pixels identified as being associated with at least one foreground object in either or both of the optical map 302 and the ground truth map 304. In this type of approach, the IoU score represents a floating point number that can range from a low value of zero (no overlap at all) to one (complete and perfect overlap). Here, higher values are indicative of better results from an algorithm 206a-206n, while lower values are indicative of poorer results from an algorithm 206a-206n.

Although FIG. 3 illustrates one example of a scoring approach 300 for optical maps during quantitative evaluation, various changes may be made to FIG. 3. For example, an IoU score may be expressed in any other suitable format. Also, other types of scores may be used to identify how much overlap or similarity exists between optical maps and ground truth maps.

Figure 4A:
FIGS. 4A and 4B illustrate an example image and its associated ground truth map for use in quantitative evaluation of optical map quality in accordance with this disclosure.
Figure 4B:
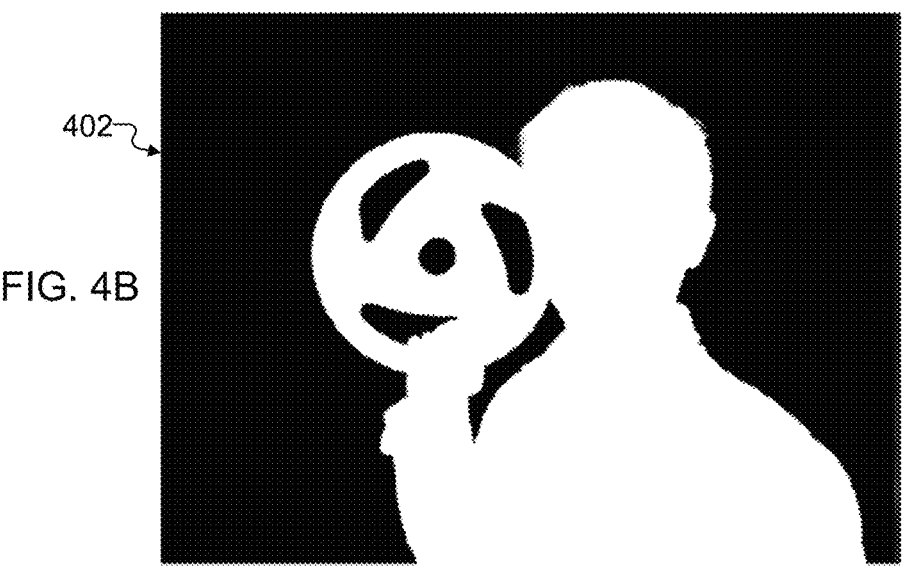

FIGS. 4A and 4B illustrate an example image 400 and its associated ground truth map 402 for use in quantitative evaluation of optical map quality in accordance with this disclosure. The image 400 may, for example, represent an input image 202 used in the technique 200 of FIG. 2. Similarly, the ground truth map 402 may represent a ground truth map 204 used in the technique 200 of FIG. 2.

As shown in FIG. 4A, the image 400 here captures a scene with a person holding a steering wheel. The person's face in FIG. 4A has been obscured for privacy. In this example, the person and the steering wheel may be considered foreground objects, while a remainder of the image 400 may contain background content. As a result, the ground truth map 402 identifies the person and the steering wheel as being foreground objects and clearly delineates their borders as contained in the image 400. In other words, the ground truth map 402 segments the image 400 into one or more foreground objects and background. The image 400 may be captured in any suitable manner, and the ground truth map 402 may be generated manually or in an automated manner. The image 400 and the ground truth map 402 may be used in the technique 200 as described below in order to evaluate a number of algorithms 206a-206n that can generate depth maps, disparity maps, or other optical maps based at least partially on the image 400.

Figure 5A:
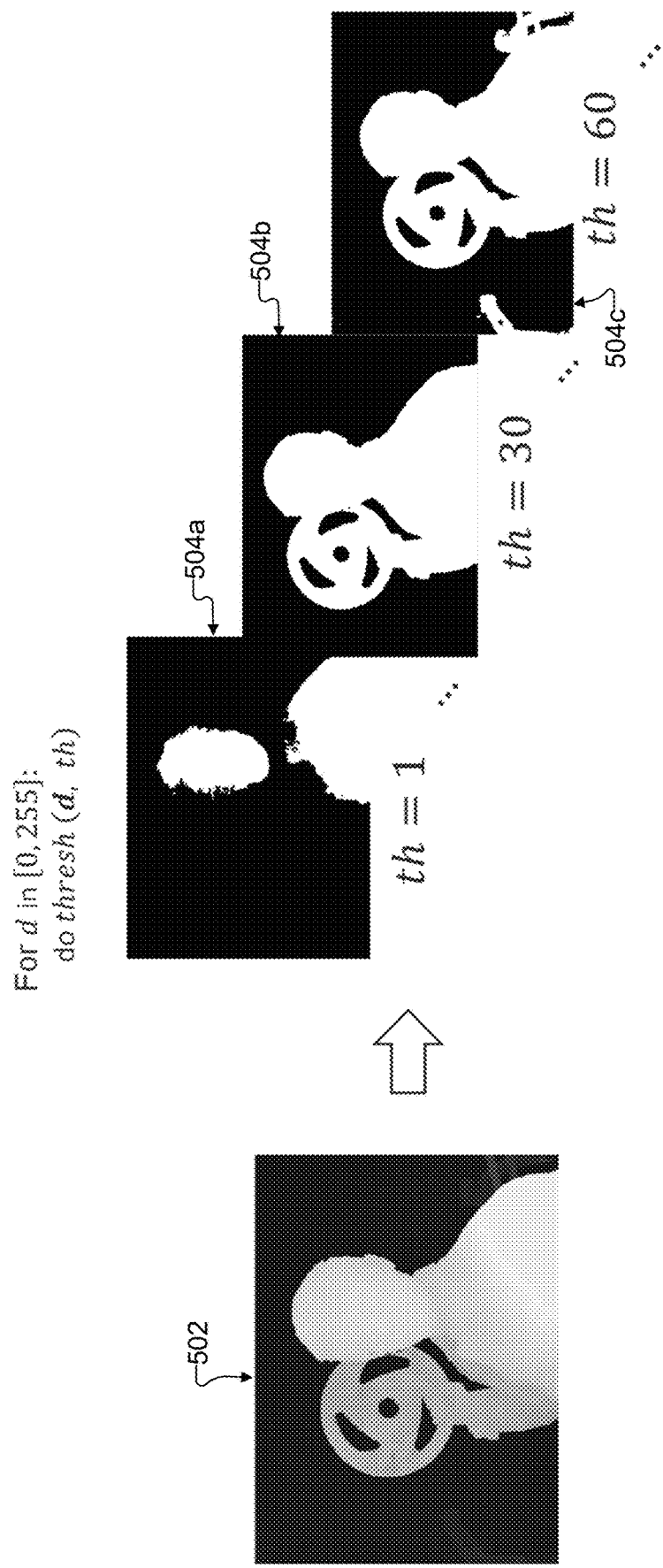
FIGS. 5A and 5B illustrate an example scoring of optical maps during quantitative evaluation in accordance with this disclosure.
Figure 5B:
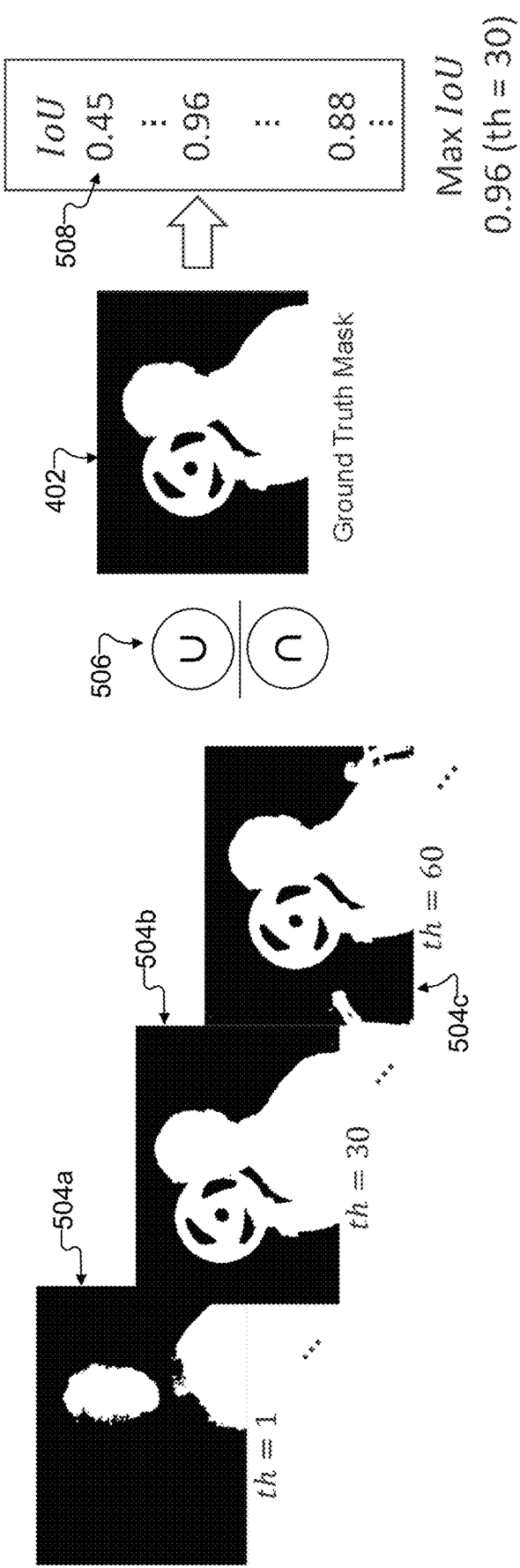

FIGS. 5A and 5B illustrate an example scoring of optical maps during quantitative evaluation in accordance with this disclosure. In particular, FIGS. 5A and 5B illustrate how one optical map 502 generated by one of the algorithms 206a-206n using the image 400 of FIG. 4A and the ground truth map 402 of FIG. 4B can be scored. Note that a similar process may be used to score other optical maps generated by other algorithms 206a-206n using the image 400.

As shown in FIG. 5A, the optical map 502 generated by an algorithm 206a-206n includes pixels of various values that might, for instance, identify different depths or disparities associated with the image 400. In some embodiments, the pixels in the optical map 502 may have quantized values, meaning the values generated by the algorithm 206a-206n are mapped to a specific set of values. As a particular example, the values generated by the algorithm 206a-206n can be mapped to eight-bit pixel values in the optical map 502, where the pixels values lie in the range of 0 to 255 (although other bit lengths and values may be used here). Note that the quantized values may be generated by the algorithm 206a-206n itself or by another application, such as a scoring application.

In this example, different thresholds are applied to the optical map 502 in order to generate thresholded optical maps, which include thresholded optical maps 504a-504c. Each thresholded optical map 504a-504c represents the pixels of the optical map 502 converted into one-bit values that are generated by applying a specific threshold to the pixel values of the optical map 502. For example, the thresholded optical map 504a is generated by using a value of one as the threshold, where pixel values below the threshold are converted into a first bit-value/color and pixel values above the threshold are converted into a second bit-value/color. The bit-value/color used when a pixel value matches the threshold can be one or the other depending on the design. The thresholded optical map 504b is generated by using a value of thirty as the threshold, where pixel values below the threshold are converted into a first bit-value/color and pixel values above the threshold are converted into a second bit-value/color. The thresholded optical map 504c is generated by using a value of sixty as the threshold, where pixel values below the threshold are converted into a first bit-value/color and pixel values above the threshold are converted into a second bit-value/color. Thresholded optical maps may be generated using numerous different values for the threshold.

As shown in FIG. 5B, an IoU ratio 506 is applied using the thresholded optical maps 504a-504c and the ground truth map 402 to generate IoU scores 508. Each IoU ratio 506 here is defined as the ratio of (i) the intersection (U) of one of the thresholded optical maps 504a-504c and the ground truth map 402 and (ii) the union (∩) of that thresholded optical map 504a-504c and the ground truth map 402. The intersection of the ratio 506 represents the number of times that pixels in common positions in both the thresholded optical map 504a-504c and the ground truth map 402 identify foreground objects. The union of the ratio 506 represents the number of times that pixels in at least one of the thresholded optical map 504a-504c and the ground truth map 402 identify foreground objects. In some embodiments, the value of the intersection can be determined by performing a logical AND operation between the pixels of the thresholded optical map 504a-504c and the corresponding pixels of the ground truth map 402 and summing the results, and the value of the union can be determined by performing a logical OR operation between the pixels of the thresholded optical map 504a-504c and the corresponding pixels of the ground truth map 402 and summing the results. Overall, this implements a segmentation evaluation task where the scores 508 identify how well the different algorithms 206a-206n generate optical maps 208a-208n that (correctly) separate one or more foreground objects from the background in a scene along the foreground object boundaries.

Example values of the IoU scores 508 are shown in FIG. 5B. In this example, it can be seen that the thresholded optical map 504a identifies part of the person but none of the steering wheel as foreground objects, so its IoU score 508 is relatively low. It can also be seen that the thresholded optical map 504b quite accurately identifies the person and the steering wheel as foreground objects, so its IoU score 508 is much higher. In addition, it can be seen that the thresholded optical map 504c quite accurately identifies the person and the steering wheel as foreground objects but incorrectly identifies other pixels as containing foreground objects, so its IoU score 508 is somewhat lower. The largest IoU score 508 can be identified, and that largest score may be used as the IoU score 210a-210n for the associated algorithm 206a-206n. It is also possible for the threshold value associated with the largest IoU score 508 to be identified as the threshold that provides the best segmentation result when processing the optical map 502 using the associated algorithm 206a-206n. In this case, for example, it can be determined that the specific algorithm 206a-206n, when used with a threshold of 30, provides the highest IoU score.

The same process shown in FIGS. 5A and 5B may be repeated for each algorithm 206a-206n, meaning the various algorithms 206a-206n can process the image 400 and generate optical maps 502 that are subjected to the same type of thresholding in order to identify the maximum score 508 for each algorithm 206a-206n. If desired, the process can also be repeated using different input images (such as images with different numbers, types, and/or arrangements of foreground objects and/or different backgrounds), and the maximum scores 508 for each algorithm 206a-206n generated using the different input images may be averaged or otherwise processed to generate the final scores 212a-212n for the algorithms 206a-206n. The scores 210a-210n and/or 212a-212n may then be used in any suitable manner, such as when presented in a tabular format or other format to a user.

Although FIGS. 4A and 4B illustrate one example of an image 400 and its associated ground truth map 402 for use in quantitative evaluation of optical map quality and FIGS. 5A and 5B illustrate one example of a scoring of optical maps during quantitative evaluation, various changes may be made to FIGS. 4A, 4B, 5A, and 5B. For example, the contents of the image 400 and ground truth map 402 can vary widely based on the circumstances. Also, the number of thresholded optical maps 504a-504c being generated can vary, and there is no requirement that thresholded optical maps 504a-504c be used (in which case each algorithm 206a-206n may generate only a single optical map 208a-208n that is scored individually without reference to a maximum score among multiple thresholded optical maps).

Figure 6:
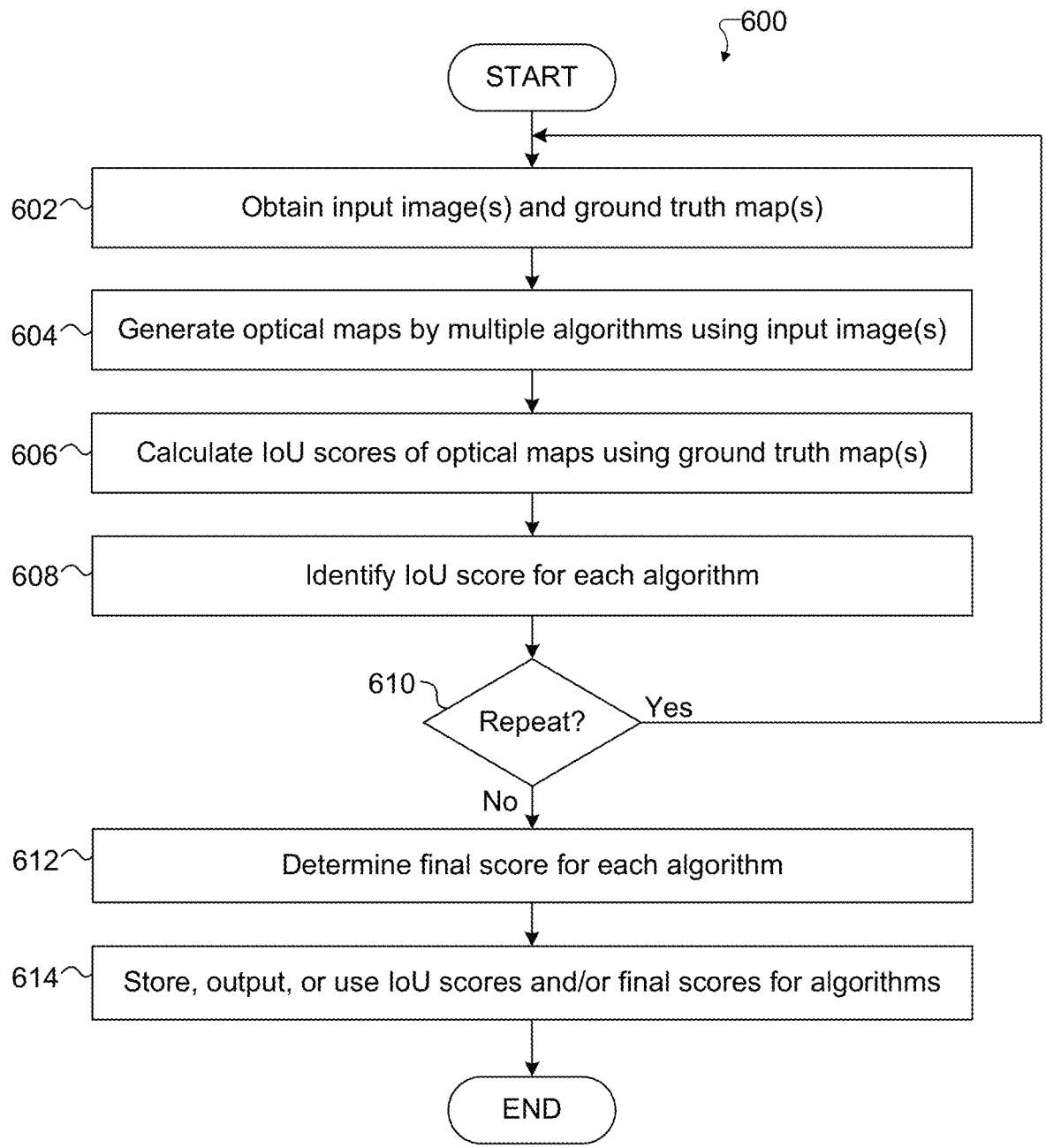
FIG. 6 illustrates an example method for quantitative evaluation of optical map quality in accordance with this disclosure.

FIG. 6 illustrates an example method 600 for quantitative evaluation of optical map quality in accordance with this disclosure. For ease of explanation, the method 600 is described as being performed in the network configuration 100 of FIG. 1, such as by the electronic device 101 or the server 106. However, the method 600 may be performed by any other suitable devices and in any other suitable systems.

As shown in FIG. 6, at least one input image and at least one ground truth map are obtained at step 602. This may include, for example, the processor 120 obtaining at least one input image 202 and at least one ground truth map 204 from any suitable source(s), possibly including itself. As noted above, the number of input images 202 and ground truth maps 204 can vary depending on the circumstances. Optical maps are generated by multiple algorithms using the input image(s) at step 604. This may include, for example, the processor 206 executing the algorithms 206a-206n in order to generate different optical maps 208a-208n, such as different depths maps, disparity maps, or optical flow maps. In some embodiments, this may include the processor 206 generating different thresholded optical maps 504a-504c based on pixel values generated by each algorithm 206a-206n (meaning each algorithm 206a-206n is used to produce multiple thresholded optical maps 504a-504c). The thresholded optical maps 504a-504c may be generated by applying different threshold values to quantized values that are produced (or that are based on the values produced) by the algorithms 206a-206n.

IoU scores are calculated for the generated optical maps using the ground truth map(s) at step 606. This may include, for example, the processor 120 using the IoU ratio 506 with each generated optical map 208a-208n (or each generated thresholded optical map 504a-504c). Each score can be based on a ratio of (i) the number of pixels in both the optical map and the ground truth map identifying foreground objects versus background and (ii) the number of pixels in either or both the optical map and the ground truth map identifying foreground objects versus background. A specific score for each algorithm is identified at step 608. This may include, for example, the processor 120 identifying the maximum IoU score 508 for each algorithm 206a-206n (assuming each algorithm 206a-206n is associated with multiple scores 508) as the IoU score 210a-210n for that algorithm.

A determination is made whether to repeat these operations at step 610. This may include, for example, the processor 120 determining whether additional input images 202 and ground truth maps 204 are to be obtained and processed. If so, the process returns to step 602. Otherwise, a final score for each algorithm is determined at step 612. This may include, for example, the processor 120 averaging or otherwise combining or using the IoU scores 210a-210n obtained during multiple iterations of steps 602-608 to generate final scores 212a-212n for the algorithms 206a-206n. The IoU scores and/or the final scores are stored, output, or used in some manner at step 614. This may include, for example, the processor 120 outputting the scores 210a-210n and/or 212a-212n in tabular or other form or performing one or more operations based on the scores, such as selecting a particular algorithm 206a-206n for use or outputting an indicator of the best-performing algorithm. Any other suitable use of the scores may be performed here.

Although FIG. 6 illustrates one example of a method 600 for quantitative evaluation of optical map quality, various changes may be made to FIG. 6. For example, while shown as a series of steps, various steps in FIG. 6 may overlap, occur in parallel, occur in a different order, or occur any number of times.

Figure 7:
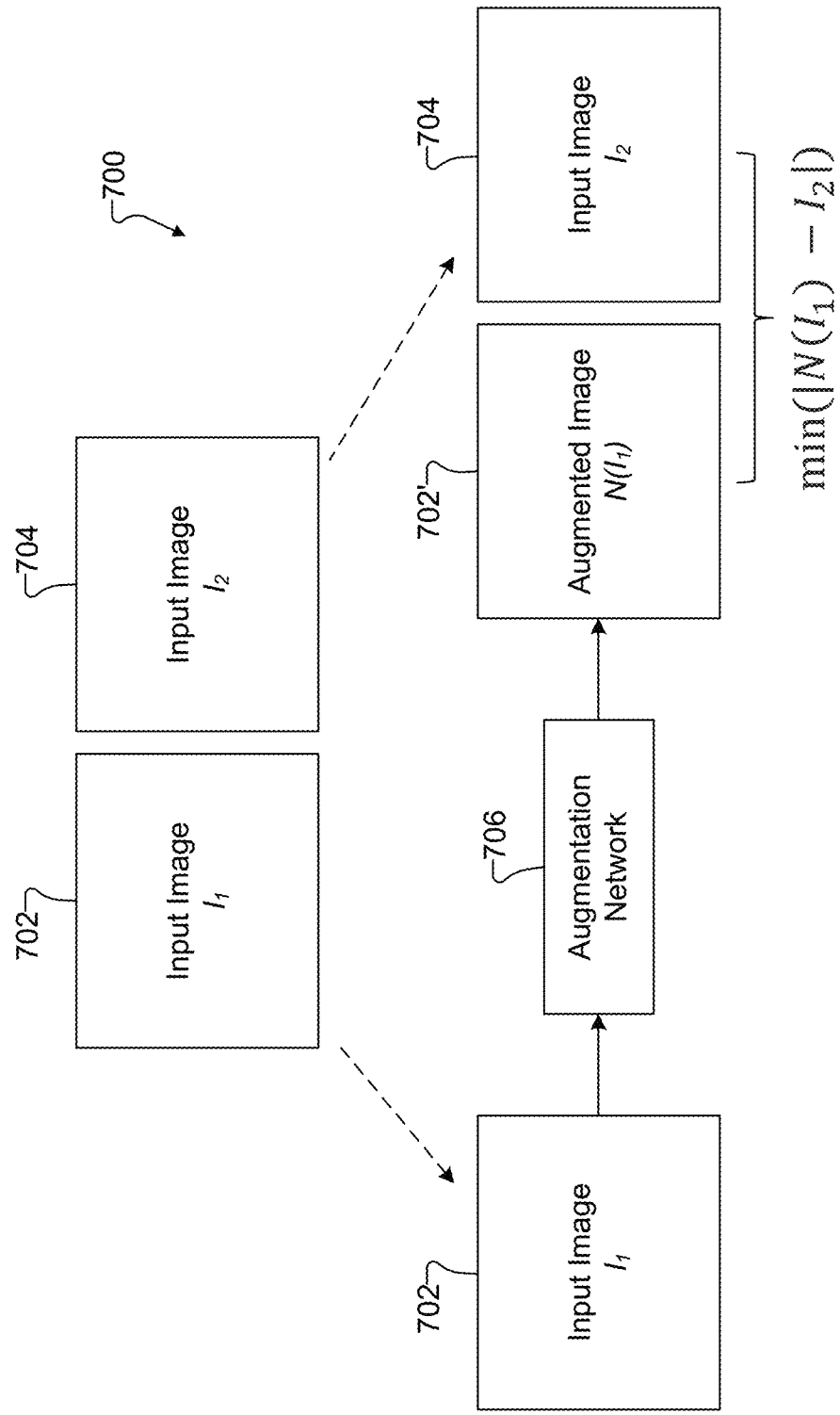
FIG. 7 illustrates an example technique for data augmentation automation in accordance with this disclosure.

FIG. 7 illustrates an example technique 700 for data augmentation automation in accordance with this disclosure. For ease of explanation, the technique 700 is described as being performed in the network configuration 100 of FIG. 1, such as by the electronic device 101 or the server 106.

However, the technique 700 may be performed by any other suitable devices and in any other suitable systems.

As shown in FIG. 7, the technique 700 operates by receiving two input images 702 and 704. Each input image 702 and 704 generally represents an image of a scene, where the input images 702 and 704 are captured using different capture settings and/or different cameras or other imaging sensors (such as different sensors 180). The input images 702 and 704 can have significant differences in one or more characteristics (such as contrast, hue, or exposure) due to the use of the different capture settings and/or due to different hardware specifications of the different imaging sensors.

In this technique 700, an augmentation network 706 processes the input image 702 and generates an augmented image 702'. The augmentation network 706 here generates the augmented image 702' while minimizing differences in contrast, hue, exposure, or other characteristics between the augmented image 702' and the input image 704. Essentially, the augmentation network 706 here adjusts the input image 702 so that its characteristics are close to or match the same characteristics of the input image 704. This is expressed in FIG. 7 as a minimization of the absolute differences between the photometric characteristics of the augmented image 702' and the input image 704. This can also be referred to as minimizing the photometric loss between the augmented image 702' and the input image 704.

Figure 8A:
FIGS. 8A and 8B illustrate an example result of data augmentation automation in accordance with this disclosure.
Figure 8B:

One example of this is shown in FIGS. 8A and 8B, which illustrate an example result of data augmentation automation in accordance with this disclosure. More specifically, FIG. 8A represents an input image 802, which may correspond to the input image 702 in FIG. 7. Also, FIG. 8B represents an augmented image 802', which may correspond to the augmented image 702' in FIG. 7. As can be seen here, the actual scene contents remain the same between the images 802 and 802'. However, the augmented image 802' may have a different brightness, a different hue, or other characteristics that differ compared to the image 802. This is because the augmentation network 706 has modified the input image 802 to have characteristics that are close to or match the characteristics of another input image (not shown) without otherwise altering the actual scene captured in the image 802.

An example benefit of generating the augmented image 802' in this manner is that the augmented image 802' can now be used (in addition to the input image 802) when training a machine learning model. Because the augmentation network 706 can itself be trained based on actual differences in real-world images as described below, the augmented image 802' is more indicative of the types of real-world differences that can exist between images to be processed by the machine learning model. By generating augmented images while minimizing photometric losses between the augmented images and original input images, augmented training data can be generated for a machine learning model more effectively (compared to simply randomly changing characteristics of the original input images).

The augmentation network 706 may use any suitable technique to generate the augmented image 702'. In some embodiments, the augmentation network 706 may itself represent a machine learning model that has been trained to generate augmented images based on input images. As a particular example, the augmentation network 706 may represent a convolution neural network or other suitable neural network that has been trained to generate augmented images. The neural network or other machine learning model can be trained, for instance, to adjust the contrast, hue, exposure, or other characteristics of input images to generate augmented images. Note, however, that any other suitable mechanism may be used to implement the augmentation network 706.

The operations and functions described above with reference to FIG. 7 can be implemented in an electronic device 101, 102, 104, server 106, or other device in any suitable manner. For example, in some embodiments, the operations and functions described above with reference to FIG. 7 can be implemented or supported using one or more software applications or other software instructions that are executed by at least one processor 120 of a device. In other embodiments, at least some of the operations and functions described above with reference to FIG. 7 can be implemented or supported using dedicated hardware components. In general, the operations and functions described above with reference to FIG. 7 can be performed using any suitable hardware or any suitable combination of hardware and software/firmware instructions.

Although FIG. 7 illustrates one example of a technique 700 for data augmentation automation and FIGS. 8A and 8B illustrate one example of a result of data augmentation automation, various changes may be made to FIGS. 7, 8A, and 8B. For example, the process shown in FIG. 7 may be repeated any number of times using any number of input images 702, 704 to generate any number of augmented images 702', which can then be used to train any suitable machine learning algorithm. As a particular example, the augmentation network 706 may also or alternatively process the input image 704 to generate an augmented image that matches or closely matches the characteristics of the input image 702. Also, the contents of the images 802, 802' are for illustration only and are merely meant to show how one input image might be modified by the augmentation network 706.

FIG. 9 illustrates an example technique 900 for training a machine learning model using data augmentation automation in accordance with this disclosure. For ease of explanation, the technique 900 is described as being performed in the network configuration 100 of FIG. 1, such as by the electronic device 101 or the server 106. However, the technique 900 may be performed by any other suitable devices and in any other suitable systems.

As shown in FIG. 9, the technique 900 operates by receiving a set of training data in the form of training images 902. The training images 902 are provided to the augmentation network 706, which generates various augmented training images 902' as described above. Note that the training images 902 may be obtained from any suitable source(s), including public or proprietary sources of image-based training data. Also note that any number of augmented training images 902' may be generated using the training images 902. In some embodiments, for instance, the training images 902 may be processed by the augmentation network 706 in pairs, and an augmented training image 902' may be generated for each pair of training images 902 or for each training image 902 in each pair of training images 902.

The training images 902 and the augmented training images 902' are used to train a machine learning model 904. The machine learning model 904 represents any suitable machine learning model to be trained to perform one or more image-based processing operations. For example, the machine learning model 904 may be trained to generate depth maps, disparity maps, optical flow maps, or other output results 906. The machine learning model 904 may use any suitable machine learning architecture, such as a convolution neural network or other neural network, to generate the output results 906. Note that any suitable technique may be used here to train the machine learning model 904. Various techniques for training machine learning models are known in the art, and additional techniques are sure to be developed in the future. Any of these techniques may be used to train the machine learning model 904 using the training images 902 and the augmented training images 902'.

Once the machine learning model 904 has been trained, the machine learning model 904 can be placed into actual use. For example, the trained machine learning model 904 may be deployed to end-user devices or other devices (such as the electronic device 101) if not already present on those devices. The trained machine learning model 904 may be used to process additional images (during an "inferencing" phase) in order to generate depth maps, disparity maps, optical flow maps, or other output results 906 for those additional images. As a particular example, the trained machine learning model 904 may receive a pair of images of a scene captured by multiple imaging sensors, and the trained machine learning model 904 may generate a depth, disparity, or other optical map associated with the pair of images. The output results 906 may be used to perform any desired function(s), such as creating the bokeh effect in a final image of the scene based on estimated depths or disparities associated with the additional images.

As can be seen here, the machine learning model 904 can be trained using both the training images 902 and the augmented training images 902'. Moreover, the augmented training images 902' can be generated based on differences between real-world images as described below. As a result, the training of the machine learning model 904 is augmented using the augmented training images 902', and the augmented training images 902' are more realistic of the types of images that may be received by the machine learning model 904 during inferencing. Because of this, the machine learning model 904 can be trained more effectively and can produce fewer artifacts compared to machine learning models trained using randomly-generated augmented images.

A dashed path 908 in FIG. 9 indicates that some of the training images 902 may actually be generated by the machine learning model 904 or based on the output results 906 from the machine learning model 904, in which case at least some of the augmented training images 902' may represent augmented versions of those generated training images 902. For example, the machine learning model 904 may be trained initially to generate depth maps, disparity maps, optical flow maps, or other optical maps, and the optical maps may be used to warp some of the training images 902. The warped training images 902 may then be used as inputs to the augmentation network 706, and the augmentation network 706 can generate augmented training images 902' (which represent augmented versions of the warped training images 902). One example of this approach is described below.

The operations and functions described above with reference to FIG. 9 can be implemented in an electronic device 101, 102, 104, server 106, or other device in any suitable manner. For example, in some embodiments, the operations and functions described above with reference to FIG. 9 can be implemented or supported using one or more software applications or other software instructions that are executed by at least one processor 120 of a device. In other embodiments, at least some of the operations and functions described above with reference to FIG. 9 can be implemented or supported using dedicated hardware components. In general, the operations and functions described above with reference to FIG. 9 can be performed using any suitable hardware or any suitable combination of hardware and software/firmware instructions.

Although FIG. 9 illustrates one example of a technique 900 for training a machine learning model using data augmentation automation, various changes may be made to FIG. 9. For example, the technique 900 may use multiple sets of training images 902 to train the machine learning model 904, and the augmentation network 706 can generate augmented training images 902' for each set. Also, multiple augmentation networks 706 may be provided and used to generate different augmented training images 902' for the machine learning model 904.

FIGS. 10, 11, 12, and 13 illustrate a specific example of training a particular machine learning model using data augmentation automation in accordance with this disclosure. In particular, FIGS. 10, 11, 12, and 13 illustrate how a specific machine learning model 1002 used to generate depth or disparity maps can be trained using the technique 900 described above in which the augmentation network 706 generates augmented training data for the machine learning model 1002. Note that the training of this specific machine learning model 1002 is for illustration only and that other machine learning models 1002 may be trained using data augmentation automation in the same or similar manner as shown here.

Figure 10:
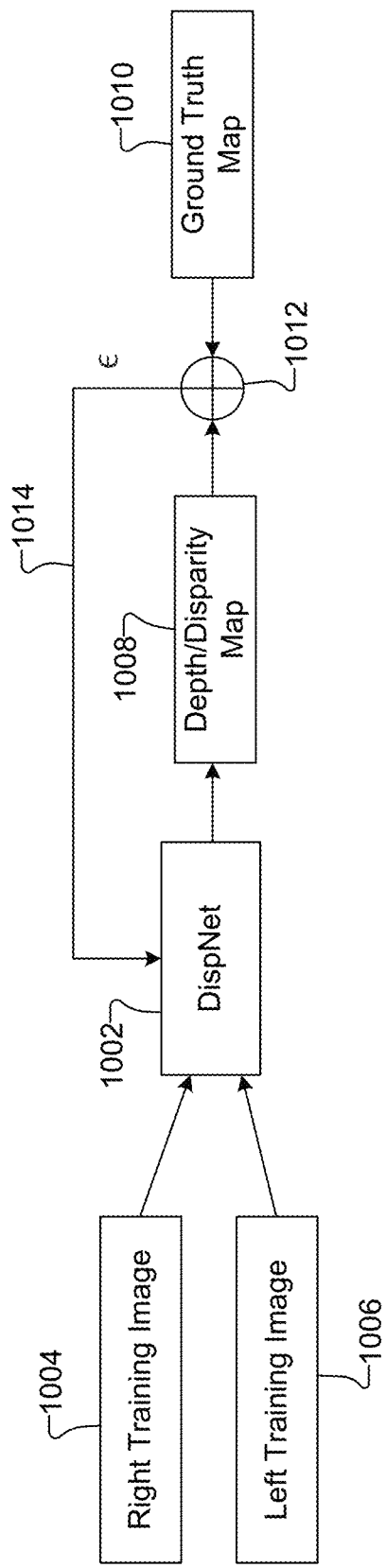
FIGS. 10, 11, 12, and 13 illustrate a specific example of training a particular machine learning model using data augmentation automation in accordance with this disclosure.

As shown in FIG. 10, the machine learning model 1002 is referred to here as "DispNet" since it is being used to generate depth or disparity maps. The machine learning model 1002 can be trained initially using pairs of training images 1004 and 1006, where each pair of training images 1004 and 1006 represents stereo images of a common scene. For example, each pair of training images 1004 and 1006 may represent images of the same scene captured using side-by-side imaging sensors (which gives rise to the "left" and "right" labels in FIG. 10). In some cases, the training images 1004 and 1006 represent synthetic images, such as computer-generated images in which depths or disparities are known with certainty.

Each pair of training images 1004 and 1006 is processed by the machine learning model 1002 to generate a depth or disparity map 1008. Note that depth and disparity are inversely related, so the identification of depth can be used to determine disparity (or vice versa). Each depth or disparity map 1008 is compared to a corresponding ground truth map 1010, which represents known or expected depths or disparities that should have been identified by the machine learning model 1002 using the associated pair of training images 1004 and 1006. A difference operation 1012 identifies the differences between the depth or disparity map 1008 and its corresponding ground truth map 1010, and the differences represent errors (ε) in the computations performed by the machine learning model 1002. These errors are provided as feedback 1014 to the machine learning model 1002 during training, which allows the machine learning model 1002 to be updated. Ideally, the updates to the machine learning model 1002 reduce the errors to a minimum or other acceptably low value.

Figure 11:
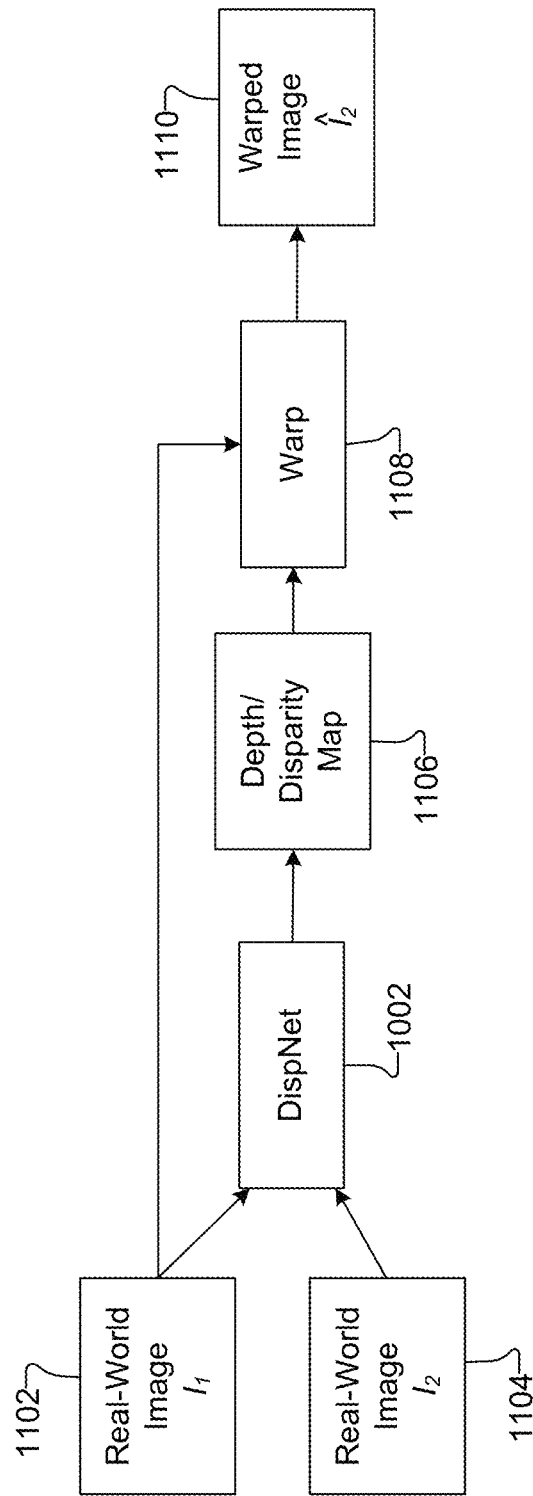

Once this part of the process is completed, the machine learning model 1002 has been initially trained to generate depth or disparities maps. At this point, the machine learning model 1002 may be used as shown in FIG. 11. Here, the machine learning model 1002 receives multiple pairs of real-world images 1102 and 1104, such as images captured using one or more imaging sensors 180. Each real-world image 1102 and 1104 represents an image of an actual physical scene. In some embodiments, each pair of real-world images 1102 and 1104 represents stereo images of a common scene. Each pair of real-world images 1102 and 1104 is processed by the machine learning model 1002 to generate a depth or disparity map 1106 associated with that pair of real-world images 1102 and 1104.

For each pair of real-world images 1102 and 1104, a warp operation 1108 is applied to one of the real-world images 1102 based on the associated depth or disparity map 1106, which leads to the generation of a warped image 1110. The warp operation 1108 warps the real-world image 1102 based on the depth or disparity map 1106 so that the warped image 1110 appears to be captured from the same position as the real-world image 1104. This helps to account for differences in the images 1102 and 1104 caused by the different positions of the imaging sensors used to capture the images 1102 and 1104.

Figure 12:
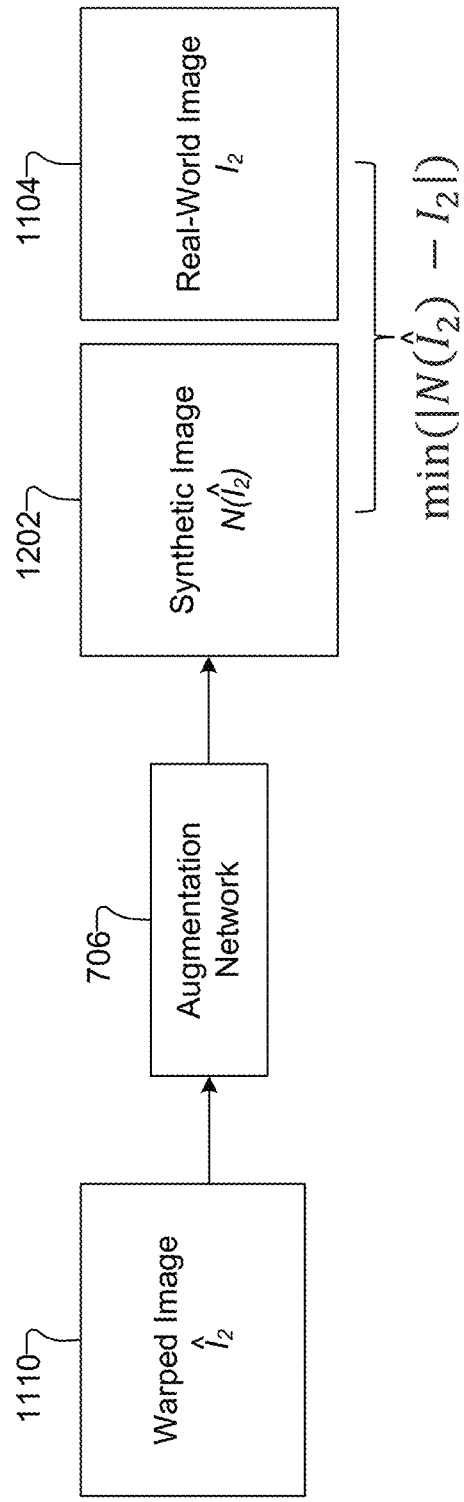

As shown in FIG. 12, each warped image 1110 (which represents a warped version of an image 1102) and its associated image 1104 are used to train the augmentation network 706. As with the process described above, the augmentation network 706 here can be trained to minimize the photometric loss between augmented images 1202 generated by the augmentation network 706 and the corresponding real-world images 1104. Again, this process is training the augmentation network 706 to learn about actual differences that can appear between real-world images 1102 and 1104 of scenes (rather than implementing random changes). As a result, the augmentation network 706 learns how to augment training data so that the augmented images have photometric differences that are the same as or similar to (such as within a threshold amount) differences between real-world images.

Figure 13:
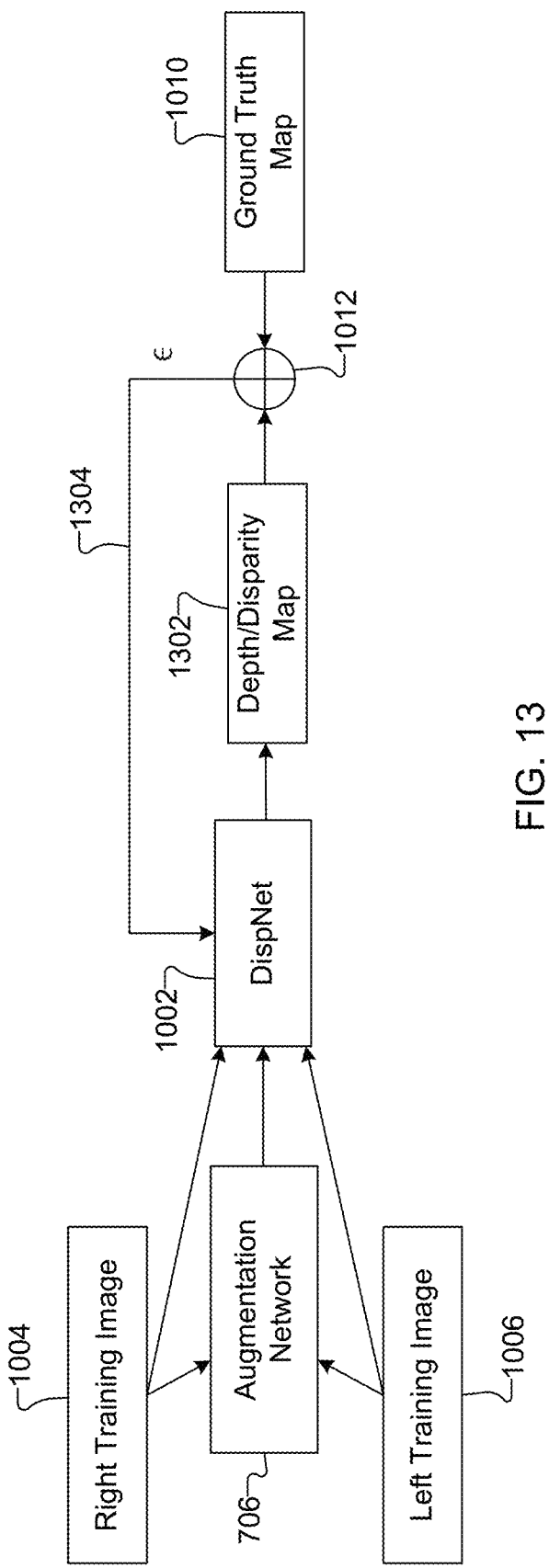

At this point, the machine learning model 1002 can be retrained as shown in FIG. 13, but now the machine learning model 1002 is trained using the training images 1004 and 1006 and augmented images generated by the trained augmentation network 706. Since the augmentation network 706 is trained in FIG. 12 based on differences between real-world images, the augmentation network 706 here may generate augmented images that have similar differences. The training images 1004 and 1006 and the augmented images are processed by the machine learning model 1002 to generate depth or disparity maps 1302, and each depth or disparity map 1302 is compared to the corresponding ground truth map 1010. The difference operation 1012 identifies the differences between each depth or disparity map 1302 and its corresponding ground truth map 1010, and the differences represent errors (ε) in the computations performed by the machine learning model 1002. These errors are provided as feedback 1304 to the machine learning model 1002 during the retraining, which allows the machine learning model 1002 to be updated. Ideally, the updates to the machine learning model 1002 reduce the errors to a minimum or other acceptably low value. Moreover, the retraining ideally causes the machine learning model 1002 to become more accurate in the generation of the depth or disparity maps 1302 compared to the machine learning model 1002 as initially trained.

Although FIGS. 10, 11, 12, and 13 illustrate one specific example of training a particular machine learning model 1002 using data augmentation automation, various changes may be made to FIGS. 10, 11, 12, and 13. For example, any suitable number of training images 1004, 1006 may be used to train and retrain the machine learning model 1002, and any suitable number of augmented images from the augmentation network 706 may be used to retrain the machine learning model 1002. Also, any suitable number of real-world images 1102, 1104 may be used to generate any suitable number of warped images 1110, which can be used to train the augmentation network 706.

FIGS. 14A, 14B, 14C, and 14D illustrate example results of using data augmentation automation for training the particular machine learning model 1002 in accordance with this disclosure. In particular, FIGS. 14A and 14B respectively illustrate two images 1402 and 1404 that may be provided to and processed by the machine learning model 1002. The images 1402 and 1404 may, for example, be captured using imaging sensors 180 of the electronic device 101.

Figure 14A:
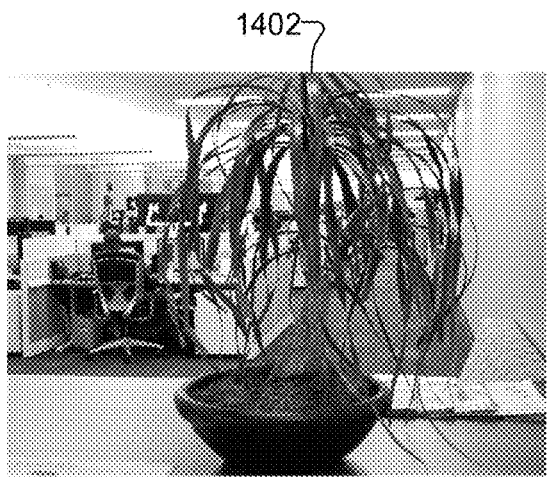
FIGS. 14A, 14B, 14C, and 14D illustrate example results of using data augmentation automation for training the particular machine learning model in accordance with this disclosure.
Figure 14B:
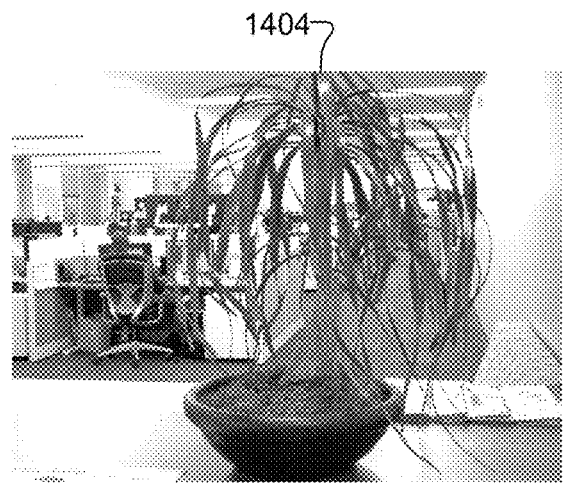
Figure 14C:
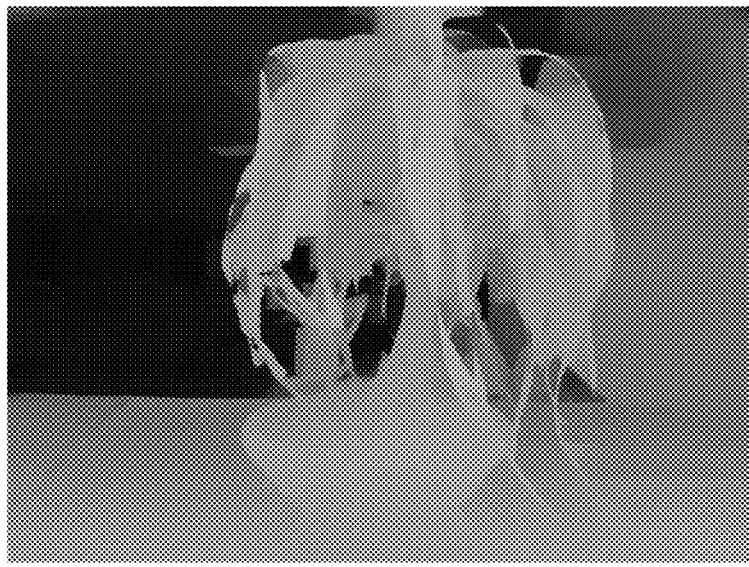

FIG. 14C illustrates an example depth or disparity map 1406 that may be generated using a conventional approach, such as when the machine learning model 1002 has been trained as shown in FIG. 10 but not retrained using data augmentation as shown in FIG. 13. As can be seen in FIG. 14C, the depth or disparity map 1406 is not particularly accurate along the right side of the depth or disparity map 1406. Here, the depth or disparity map 1406 incorrectly indicates that a couch and a wall behind and to the right of the plant is at or near the same depth as part of the plant.

Figure 14D:
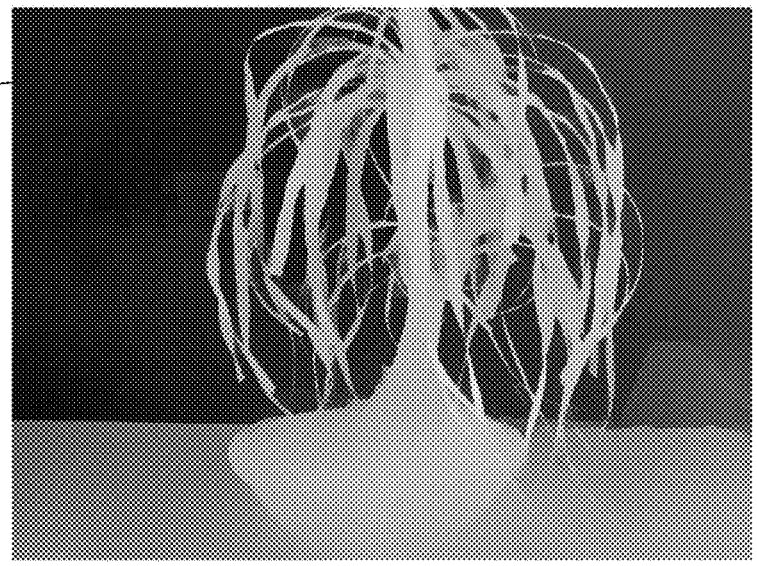

FIG. 14D illustrates an example depth or disparity map 1408 that may be generated using the machine learning model 1002 after being trained as shown in FIG. 10 and retrained using data augmentation as shown in FIG. 13. As can be seen in FIG. 14D, the depth or disparity map 1408 is much more accurate and more clearly differentiates the depths of the plant and objects in the background. This indicates that the use of data augmentation to train (or retrain) the machine learning model 1002 can help to improve the output results from the machine learning model 1002.

Although FIGS. 14A, 14B, 14C, and 14D illustrate one example of results of using data augmentation automation for training the particular machine learning model 1002, various changes may be made to FIGS. 14A, 14B, 14C, and 14D. For example, the contents of the images 1402, 1404 and the contents of the depth or disparity maps 1406, 1408 are for illustration only and are merely meant to show how machine learning models may be improved using the augmentation network 706. Since images can vary greatly and the augmentation network 706 can be trained in different ways, the actual results obtained in any specific implementation of the augmentation network 706 and the machine learning model 1002 can vary.

Figure 15:
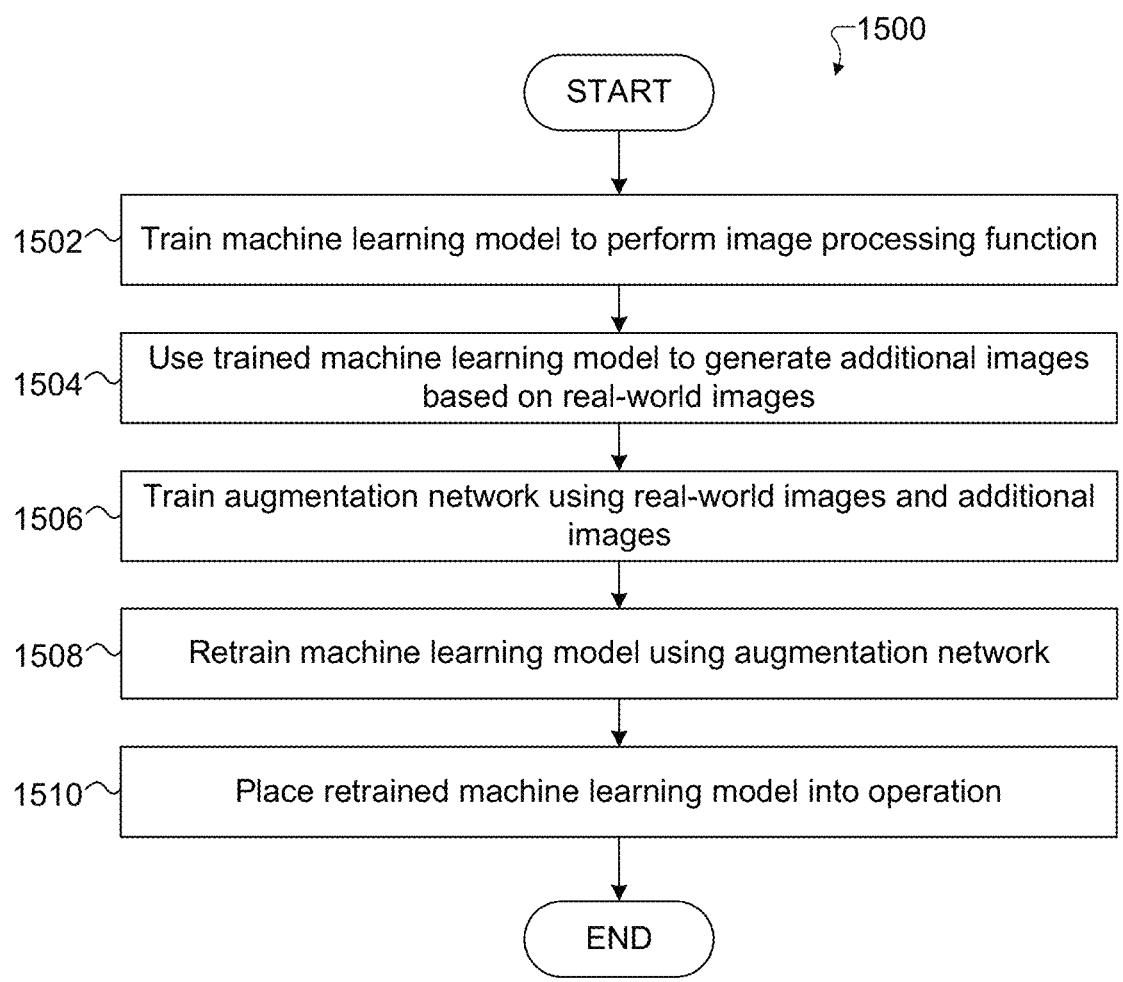
FIG. 15 illustrates an example method for data augmentation automation in accordance with this disclosure.

FIG. 15 illustrates an example method 1500 for data augmentation automation in accordance with this disclosure. For ease of explanation, the method 1500 is described as being performed within the network configuration 100 of FIG. 1, such as by the electronic device 101 or the server 106. However, the method 1500 may be performed using any other suitable devices and in any other suitable systems.

As shown in FIG. 15, a machine learning model is trained to perform an image processing function at step 1502. This may include, for example, the processor 120 of the electronic device 101, server 106, or other device training the machine learning model 904, 1002 using training images 902, 1004, 1006. The machine learning model 904, 1002 may be trained to perform any suitable function here, such as the generation of depth maps, disparity maps, optical flow maps, or other optical maps or other output results 906. The trained machine learning model is used to generate additional images based on real-world images at step 1504. This may include, for example, the processor 120 using the trained machine learning model 904, 1002 to process real-world images 1102, 1104 and produce optical maps, which can then be used by the warp operation 1108 to produce warped images 1110. An augmentation network is trained using at least some of the real-world images and at least some of the additional images at step 1506. This may include, for example, the processor 120 training the augmentation network 706 using the warped images 1110 and at least some of the real-world images 1102, 1104.

The machine learning model is retrained using the augmentation network at step 1508. This may include, for example, the processor 120 providing at least some of the training images 902, 1004, 1006 to the trained augmentation network 706 for use in producing augmented images. As described above, each augmented image may have the same image content as one of the training images 902, 1004, 1006 but be modified to have photometric characteristics of another of the training images 902, 1004, 1006. The retrained machine learning model is placed into operation at step 1510. This may include, for example, the processor 120 using the retrained machine learning model 904, 1002 to process additional images and generate additional depth maps, disparity maps, optical flow maps, or other optical maps or other output results 906. Alternatively, this may include the processor 120 providing the retrained machine learning model 904, 1002 to another device for use, such as when the server 106 provides the retrained machine learning model 904, 1002 to the electronic device 101 for use.

Although FIG. 15 illustrates one example of a method 1500 for data augmentation automation, various changes may be made to FIG. 15. For example, while shown as a series of steps, various steps in FIG. 15 may overlap, occur in parallel, occur in a different order, or occur any number of times.

Note that while this disclosure has described devices and techniques for quantitative evaluation of optical map quality and for data augmentation automation, the quantitative evaluation of optical map quality may be used separately or together with data augmentation automation. Thus, a device or system may implement quantitative evaluation of optical map quality, data augmentation automation, or both.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
    obtaining multiple images and multiple ground truth maps associated with the multiple images;
    for each of the multiple images, generating multiple optical maps using multiple algorithms and the image;
    for each algorithm, identifying multiple scores for the algorithm using one or more of the optical maps generated using the algorithm and the ground truth maps, wherein the multiple scores for the algorithm are associated with different images of the multiple images; and
    combining the multiple scores for each algorithm to identify a final score for each algorithm;
    wherein the ground truth map identify one or more boundaries associated with one or more foreground objects in images; and
    wherein the scores identify how well the optical maps generated using the algorithms separate the one or more foreground objects from a background in the images.

2. The method of claim 1, wherein each score comprises an intersection over union score determined as a ratio of (i) an intersection between a specified one of the optical maps and a specified one of the ground truth maps and (ii) a union between the specified one of the optical maps and the specified one of the ground truth mapss.

3. The method of claim 2, wherein:
    the intersection between the specified one of the optical maps and the specific one of the ground truth maps is based on a number of pixels identified as being associated with the one or more foreground objects in both the specified one of the optical maps and the specified one of the ground truth map; and
    the union between the specified one of the optical maps and the specified one of the ground truth maps is based on a number of pixels identified as being associated with the one or more foreground objects in either or both the specified one of the optical maps and the specified one of the ground truth map.

4. The method of claim 2, wherein:
    the intersection between the specified one of the optical maps and the specified one of the ground truth maps is determined using a logical AND of pixels in the specified one of the optical maps and the specified one of the ground truth maps; and
    the union between the specified one of the optical maps and the specified one of the ground truth maps is determined using a logical OR of the pixels in the specified one of the optical maps and the specified one of the ground truth maps.

5. The method of claim 1, wherein:
    generating the multiple optical maps comprises applying multiple thresholds to quantized values in order to produce multiple thresholded optical maps associated with each algorithm; and
    identifying the scores for each algorithm comprises:
        identifying multiple second scores for the multiple thresholded optical maps associated with the algorithm; and
        identifying a maximum score among the multiple second scores associated with the algorithm.

6. The method of claim 1, wherein each threshold optical map comprises (i) a first bit-value or color representing pixel values under a specified threshold and (ii) a second bit-value or color representing pixel values above the specified threshold.

7. The method of claim 1, wherein the optical maps comprise at least one of: depth maps, disparity maps, or optical flow maps.

8. An apparatus comprising:
    at least one processor configured to:
        obtain multiple images and multiple ground truth maps associated with the multiple images;
        for each of the multiple images, generate multiple optical maps using multiple algorithms and the image;
        for each algorithm, identify multiple scores for the algorithm using one or more of the optical maps generated using the algorithm and the ground truth maps, wherein the multiple scores for the algorithm are associated with different images of the multiple images; and
        combine the multiple scores for each algorithm to identify a final score for each algorithm;
    wherein the ground truth maps identify one or more boundaries associated with one or more foreground objects in the images; and
    wherein the scores identify how well the optical maps generated using the algorithms separate the one or more foreground objects from a background in the mages.

9. The apparatus of claim 8, wherein each score comprises an intersection over union score determined as a ratio of (i) an intersection between a specified one of the optical maps and a specified one of the ground truth maps and (ii) a union between the specified one of the optical maps and the specified one of the ground truth map.

10. The apparatus of claim 9, wherein:
the intersection between the specified one of the optical maps and the specified one of the ground truth maps is based on a number of pixels identified as being associated with the one or more foreground objects in both the specified one of the optical maps and the specified one of the ground truth maps; and
the union between the specified one of the optical maps and the specified one of the ground truth maps is based on a number of pixels identified as being associated with the one or more foreground objects in either or both the specified one of the optical maps and the specified one of the ground truth maps.

11. The apparatus of claim 9, wherein:
the intersection between the specified one of the optical maps and the specified one of the ground truth maps is determined using a logical AND of pixels in the specified one of the optical maps and the specified one of the ground truth maps; and
the union between the specified one of the optical maps and the specified one of the ground truth maps is determined using a logical OR of the pixels in the specified one of the optical maps and the specified one of the ground truth maps.

12. The apparatus of claim 8, wherein:
to generate the multiple optical maps, the at least one processor is configured to apply multiple thresholds to quantized values in order to produce multiple thresholded optical maps associated with each algorithm; and
to identify the scores for each algorithm, the at least one processor is configured to:
identify multiple second scores for the multiple thresholded optical maps associated with the algorithm; and
identify a maximum score among the multiple second scores associated with the algorithm.

13. The apparatus of claim 12, wherein each thresholded optical map comprises (i) a first bit-value or color representing pixel values under a specified threshold and (ii) a second bit-value or color representing pixel values above the specified threshold.

14. The apparatus of claim 8, wherein the optical maps comprise at least one of: depth maps, disparity maps, or optical flow maps.

15. A non-transitory computer readable medium containing instructions that when executed cause at least one processor to:
obtain multiple images and multiple ground truth maps associated with the multiple images;
for each of the multiple images, generate multiple optical maps using multiple algorithms and the image;
for each algorithm, identify at least multiple scores for the algorithm using one or more of the optical maps generated using the algorithm and the ground truth maps, wherein the multiple scores for the algorithm are associated with different images of the multiple images; and
combine the multiple scores for each algorithm to identify a final score for each algorithm;
wherein the ground truth maps identify one or more boundaries associated with one or more foreground objects in the images; and
wherein the scores identify how well the optical maps generated using the algorithms separate the one or more foreground objects from a background in the images.

16. The non-transitory computer readable medium of claim 15, wherein each score comprises an intersection over union score determined as a ratio of (i) an intersection between a specified one of the optical maps and a specified one of the ground truth maps and (ii) a union between the specified one of the optical maps and the specified one of the ground truth maps.

17. The non-transitory computer readable medium of claim 16, wherein:
the intersection between the specified one of the optical maps and the specified one of the ground truth maps is based on a number of pixels identified as being associated with the one or more foreground objects in both the specified one of the optical maps and the specified one of the ground truth maps; and
the union between the specified one of the optical maps and the specified one of the ground truth maps is based on a number of pixels identified as being associated with the one or more foreground objects in either or both the specified one of the optical maps and the specified one of the ground truth maps.

18. The non-transitory computer readable medium of claim 16, wherein:
the intersection between the specified one of the optical maps and the specified one of the ground truth maps is determined using a logical AND of pixels in the specified one of the optical maps and the specified one of the ground truth maps; and
the union between the specified one of the optical maps and the specified one of the ground truth maps is determined using a logical OR of the pixels in the specified one of the optical maps and thespecified one of the ground truth maps.

19. The non-transitory computer readable medium of claim 15, further containing instructions that when executed cause the at least one processor to apply multiple thresholds to quantized values in order to produce multiple thresholded optical maps associated with each algorithm;
wherein the instructions that when executed cause the at least one processor to identify the at least one score for each algorithm comprise instructions that when executed cause the at least one processor to:
identify multiple scores for the multiple thresholded optical maps associated with the algorithm; and
identify a maximum score among the multiple scores associated with the algorithm.

20. The non-transitory computer readable medium of claim 19, wherein each thresholded optical map comprises (i) a first bit-value or color representing pixel values under a specified threshold and (ii) a second bit-value or color representing pixel values above the specified threshold.

* * * * *